(12) United States Patent
Tsunoda et al.

(10) Patent No.: US 7,430,085 B2
(45) Date of Patent: Sep. 30, 2008

(54) DISK DEVICE AND METHOD OF GENERATING SIGNAL REPRESENTING HEAD

(75) Inventors: Motoyasu Tsunoda, Yokohama (JP); Shoichi Miyazawa, deceased, late of Yokohama (JP); by Yukie Miyazawa, legal representative, Yokohama (JP); Hitoshi Ogawa, Yokohama (JP); Ryutaro Horita, Yokohama (JP); Takashi Nara, Takasaki (JP); Masatoshi Nishina, Kanagawa-ken (JP); Katsumi Yamamoto, Kokubunji (JP)

(73) Assignee: Hitachi Global Storage Technologies Japan, Ltd., Odawara-shi (JP)

( * ) Notice: Subject to any disclaimer, the term of this patent is extended or adjusted under 35 U.S.C. 154(b) by 38 days.

(21) Appl. No.: 11/507,436

(22) Filed: Aug. 22, 2006

(65) Prior Publication Data

US 2006/0285238 A1 Dec. 21, 2006

Related U.S. Application Data

(60) Continuation of application No. 10/388,472, filed on Mar. 17, 2003, now Pat. No. 7,139,143, which is a continuation of application No. 10/200,509, filed on Jul. 23, 2002, now Pat. No. 6,563,656, which is a continuation of application No. 09/716,326, filed on Nov. 21, 2000, now Pat. No. 6,445,522, which is a division of application No. 08/857,171, filed on May 15, 1997, now Pat. No. 6,172,828.

(30) Foreign Application Priority Data

May 16, 1996 (JP) .................................. 8-121959
Jun. 11, 1996 (JP) .................................. 8-148902

(51) Int. Cl.
*G11B 5/09* (2006.01)
(52) U.S. Cl. .......................................... 360/46; 360/51
(58) Field of Classification Search ....................... None
See application file for complete search history.

(56) References Cited

U.S. PATENT DOCUMENTS 4,396,959 A 8/1983 Harrison et al.

(Continued)

FOREIGN PATENT DOCUMENTS

JP 57-86910 5/1982

(Continued)

*Primary Examiner*—Andrea Wellington
*Assistant Examiner*—Dan I Davidson
(74) *Attorney, Agent, or Firm*—Mattingly, Stanger, Malur & Brundidge, P.C.

(57) ABSTRACT

A signal processing device having a feature of analog-to-digital converting a burst signal has a feature of selecting data bus to notify a disk control device 2 of a conversion result via an NRZ data bus. The disk control device 2 includes means for storing the result of the analog-to-digital conversion of said servo positional signal. The positional signal of a head of the disk device is digitalized in an R/W channel. Sampling for digital conversion is performed in only a window which is defined only in the vicinity of peaks of the positional signal. The values of peaks which are obtained by sampling are averaged by an averaging circuit. This enables the influence of noise occurred outside of the window to be eliminated. Although the noise in the window is sampled, its adverse influence is suppressed by the averaging processing.

2 Claims, 18 Drawing Sheets

U.S. PATENT DOCUMENTS

| | | |
|---|---|---|
| 5,023,733 A | 6/1991 | Koga et al. |
| 5,341,249 A | 8/1994 | Abbott et al. |
| 5,422,760 A | 6/1995 | Abbott et al. |
| 5,463,603 A | 10/1995 | Petersen |
| 5,517,631 A | 5/1996 | Machado et al. |
| 5,523,903 A | 6/1996 | Hetzler et al. |
| 5,576,910 A | 11/1996 | Romano et al. |
| 5,594,600 A | 1/1997 | Bruner et al. |
| 5,684,651 A | 11/1997 | Yaegashi et al. |
| 6,519,104 B1 | 2/2003 | Cloke |
| 6,584,516 B1 | 6/2003 | Hill |

FOREIGN PATENT DOCUMENTS

| | | |
|---|---|---|
| JP | 3-35478 | 2/1991 |
| JP | 6-44708 | 2/1994 |
| JP | 6-124554 | 5/1994 |
| JP | 6-259885 | 9/1994 |
| JP | 7-182786 | 7/1995 |
| JP | 7-211006 | 8/1995 |
| JP | 8-115503 | 5/1996 |

EXAMPLE OF CONFIGURATION OF DATA FORMAT

SCTP : SECTOR PULSE
SSCT : SERVO SECTOR
DSCTA,B : DATA SECTOR A,B

AGCG : AUTO GAIN CONTROL GAP
SVMK : SERVO MARK
IDXM : INDEX MARK
SCTM : SECTOR MARK

CYL : CYLINDER ADDRESS
SSA : SERVO SECTOR ADDRESS
POS : POSITION PATTERN

ISG : INTER SECTOR GAP
PLO : PLO PATTERN
BS : BYTE SYNC PATTERN
DATA : USER DATA
ECC : ERROR CORRECING CODE

SYSTEM CONFIGURATION OF DISK DEVICE

CONFIGURATION OF PRIOR ART SIGNAL PROCESSING DEVICE

CONFIGURATION OF SERVO CONTROL UNIT

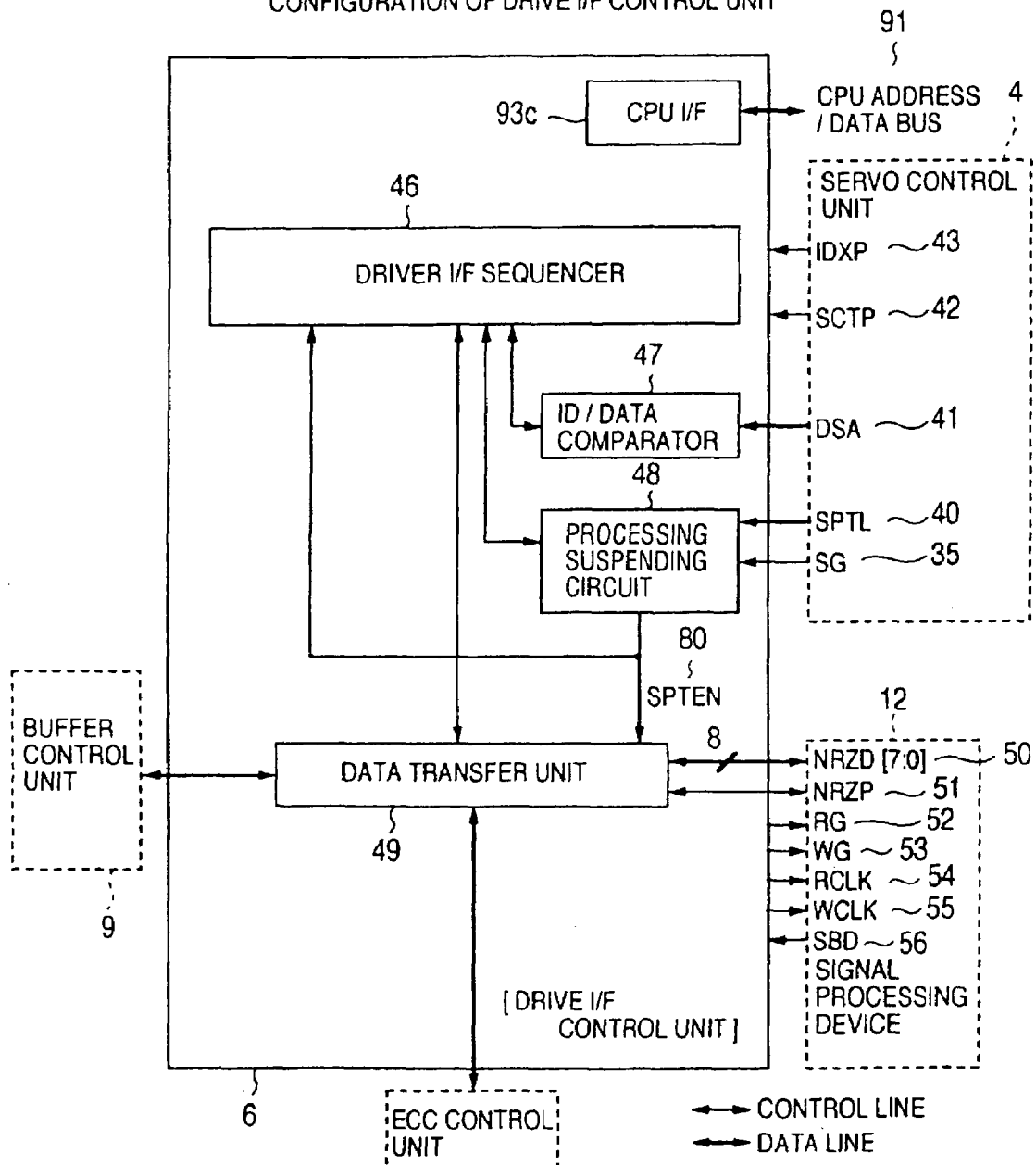

DATA SECTOR FORMAT

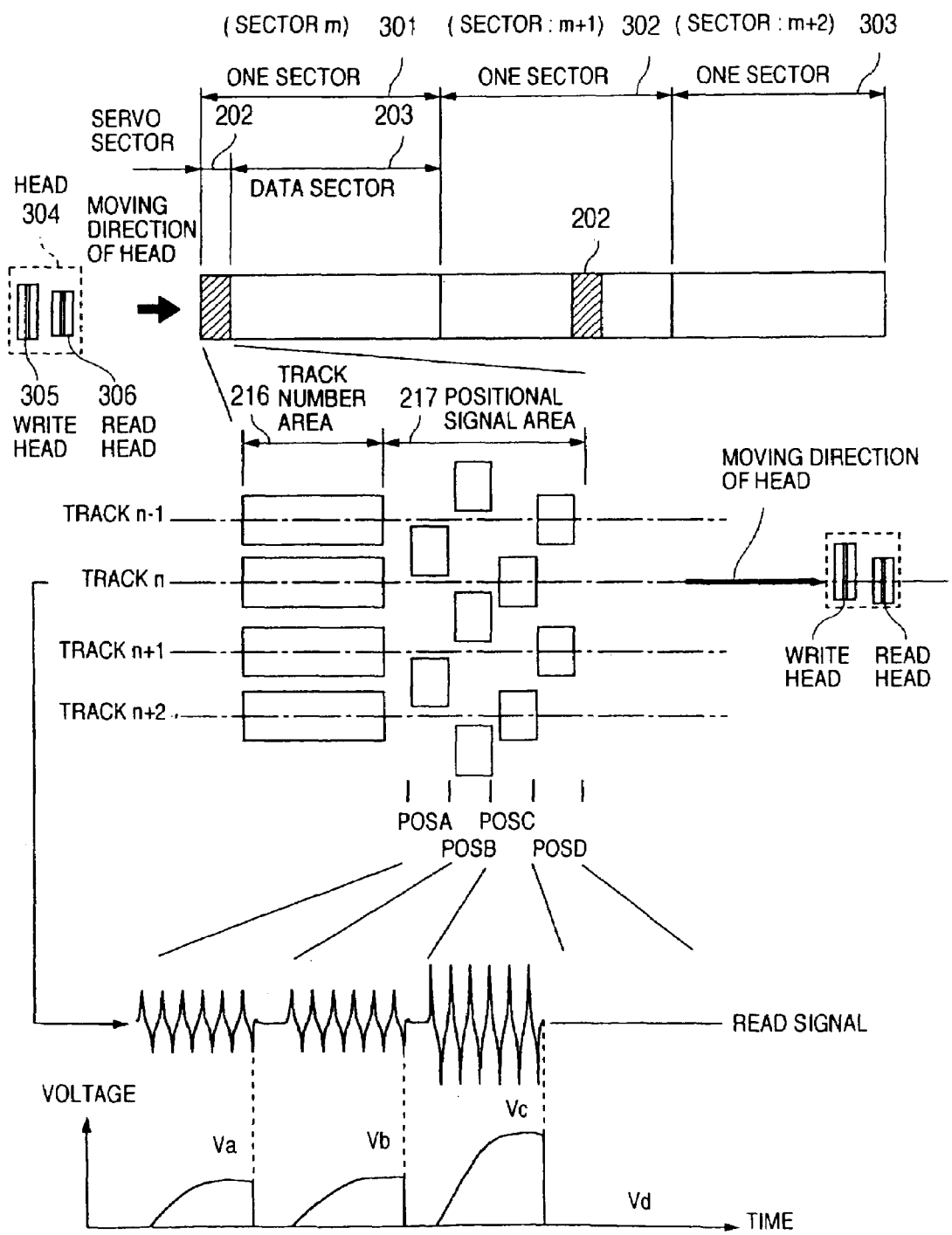

EXAMPLE OF INTERFACE TIMING

CONFIGURATION EXAMPLE 2 OF SIGNAL PROCESSING DEVICE AND PERIPHERAL CONTROL UNIT IN PRESENT INVENTION

REFERENCE POWER SUPPLY VOLTAGE
CHANGING SYSTEM

# DISK DEVICE AND METHOD OF GENERATING SIGNAL REPRESENTING HEAD

This application is a continuation of U.S. application Ser. No. 10/388,472, filed Mar. 17, 2003 now U.S. Pat. No. 7,139,143, now allowed, which is a continuation of U.S. application Ser. No. 10/200,509, filed Jul. 23, 2002, now U.S. Pat. No. 6,563,656, which is a continuation of U.S. application Ser. No. 09/716,326, filed Nov. 21, 2000, now U.S. Pat. No. 6,445,522, which is a divisional application of U.S. Ser. No. 08/857,171, filed May 15, 1997, now U.S. Pat. No. 6,172,828. The entirety of the prior applications are incorporated herein by reference.

BACKGROUND OF THE INVENTION a) Field of the Invention

The present invention relates to a disk device, and in particular to a circuit for processing servo information and a method of generating a signal representative of the position of a head for reading/writing data in an auxiliary storage of an electronic data processing device using a disk type storage medium.

b) Description of the Related Art

As personal computers have recently been improved in performance and their costs have been reduced, data storage devices, in particular magnetic disk devices, are strongly demanded to provide a large quantity of storage capacity and to reduce its cost.

For this reason, the electronic circuits for disk devices have been year by year integrated into smaller circuits while incorporating large storage capacity with increasing technology. Prior to describing the operation of the electronic circuit, current disk formats will be described.

FIGS. 1A, 1B, 1C and 1D show an example of a disk format. A disk format is mainly classified into a sector (SSCT 78 in FIG. 1B) provided for controlling the position of a head on a recording medium, which records/reproduces a data, and a data sector (DSCT 79) provided for storage of user data. The SSCT 78 comprises an Automatic gain control gap (AGCG) 60, a Servo mask (SVMK) 61, an Index mark (IDXM) 76/Sector mark (SCTM) 77, a Cylinder address (CYL) 63, a Servo sector address (SSA) 64 and a Positioned pattern (POS) 65.

The AGCG 60 and SVMK 61 are areas provided for controlling the read gain of servo information and for detecting the leading position of SSCT 78, respectively. The IDXM 76/SCTM 77 are areas for identifying the leading position of a track or sector. The CYL 63 and the SSA 64 are areas for storing the cylinder number (track number) and the servo sector address, respectively.

The POS 65 usually stores therein four pieces of information for precisely positioning a head among cylinders (burst signals A 66, B 67, C 68, D 69) and is used for controlling the precise positioning operation (settling) and tracking (following) operation to constantly position the head on a desired cylinder.

On the other hand, the DSCTA 79 comprises an Inter sector gap (ISG) 70, PLO pattern (PLO) 71, byte sync data (BS) 72, user data (DATA) 73, and an Error correcting code (EGC) 74. The ISG 70 is an area for absorbing the variations in rotation of the disk. The PLO 71 is an area for synchronization of read data with clock. The BS 72 is an area for detecting the timing in which serial data is converted into parallel data. The DATA 73 is an area for storing the user data therein. The ECC 74 is an area for checking whether or not there is an error in the read DATA 73 and for correcting the error if any.

DSCTB 79 is the format in which SSCT 78 is inserted into DSCTA 79, fundamentally. However, PLO 71, BS 72 are repeatedly disposed. This means, while reading out, since read processing is interrupted once when passing SSCT 78, therefore, it is necessary to carry out clock synchronization and byte synchronization to activate read processing again.

Now, the configuration of a prior art circuit for controlling the present format will be described with reference to FIGS. 2 to 5.

FIG. 2 is a block diagram showing the system configuration of a disk device 1 adopting a data surface servo format. The disk device 1 comprises a disc control device 2, signal processing device 12, motor driver 14, R/W amplifier 13, R/W head 7 and data surface recording medium 15. The disk control device 2 comprises a data processing unit 3, servo control unit 4 and CPU 5. The data processing unit 3 comprises a host interface control unit 10, buffer control unit 9, drive interface unit (hereinafter referred to as "drive I/F control unit) 6 and ECC control unit 8 and may include a data buffer 11 in the data processing unit 3. FIG. 2 shows the system configuration in which the data buffer 11 is included in the data processing unit 3.

In this configuration, the data processing unit 3 is integrated into single LSI (data processing device). Each of the motor driver 14 and the signal processing device 12 is integrated into single LSI.

Now, operation of each of the above-mentioned blocks will be described by a way of reproducing operation of data in a case where the disk format shown in FIGS. 1A, 1B, 1C and 1D is adopted.

The CPU 5 calculates the address on the recording medium 15 where the data which is requested by a host computer is stored and informs the servo control unit 4 of it. The servo control unit 4 detects the CYL 63 and POS 65 via the signal processing device 12 and outputs to the motor driver 14 a control signal to cause R/W head 7 to settle on and to track the cylinder where the requested data exists. The servo control unit 4 also detects SSA 64 shown in FIG. 1B and informs the drive I/F control unit 6 of the sector address of PSCT 79 where the R/W head 7 is positioned. The motor driver 24 controls the voice coil motor (VCM) based upon the control signal and also outputs a control signal for the spindle motor.

On the other hand, the drive I/F control unit 6 determines as to whether or not the data sector address informed from the servo control unit 4 matches a desired sector. If they match, the drive I/F control unit 6 generates a read instruction signal to the signal processing device 12 for initiating reading of data. The signal which is read out by the R/W head 7 and R/W amplifier 13 is synchronized with the read data with reference to PLO 71 shown in FIG. 1C in the signal processing device 12 and is discriminated into a clock and a Non return to Zero (NRZ) data. The DATA 73 shown in the drawing is processed so that the serial data is converted into parallel data based upon BS 72 and the converted data is transferred to the drive I/F control unit 6.

The control unit 6 also transfers the parallel data to ECC control unit 8 simultaneously with the transfer to the buffer control unit 9. In the ECC control unit 9, error detection for DATA 73 is conducted based upon the read DATA 73 and ECC 74. If an error is detected, the error can be corrected. If no error is detected, the DATA 73 is transferred to the host computer 16 from the buffer control unit 9 via the data buffer 11 and the host interface control unit 10. A description of the recording operation of data will be omitted herein since the data to be recorded is transferred in a path which is substantially reverse to the reproducing operation.

The circuits which are strongly correlated with the present invention are the signal processing device 12, servo control unit 4 and the drive I/F control unit 6. Now, each of these blocks will be described.

FIG. 3 shows the configuration of the circuit of the signal processing device 12, which comprises an Automatic gain control (AGC) 17, filter 18, burst signal detector 22, pulse generator 19, clock generator 20, encoder/decoder (EN/DEC) 21 and a central processing unit interface (CPU I/F) circuit 93A. The AGC 17 is adapted to automatically control the amplitude gain of a signal (RDATA) 44 which is read from the recording medium 25 via the read/write (R/W) amplifier 13. The filter 18 eliminates the noise components in the signal. The pulse generator 19 is adapted to generate a digital signal (pulse) from the read out analog signal.

At this time, the above-mentioned SVMK 61, IDXM 76/SCTM77, CYL 63 and SSA 64 are fed to the servo control unit 4 as a read data pulse (RDP) 39. The clock generator 20 generates a clock which is synchronized with the pulse which is generated in the pulse generator 19 and outputs it to EN/DEC 21. The EN/DEC 21 encodes the NRZ data when data is written in synchronization with the sync clock and decodes the digital signal when the data is read. The EN/DEC 21 conducts conversion of parallel data into serial data during a write operation and conversion of serial data into parallel data during a read operation.

The burst signal detector 22 detects an analog burst signal Aout[0:3] (hereinafter referred to as Aout 38) corresponding to each burst area from the analog signal output from the filter 18 in accordance with an instruction of the servo control unit 4 and outputs it. The CPU I/F circuit 93A is a circuit which conducts read/write of a register disposed within each circuit and is connected to the CPU 5 via the serial I/O 92 as shown in FIG. 2.

FIG. 4 shows an exemplary configuration of a prior art servo control unit 4. A servo control sequencer 23 which is an essential part of the servo control unit 4 detects the above-mentioned SVMK 61, IDXM 76/SCTM77 from a read data pulse (RDP) which is detected in the read data pulse (RDP) detecting circuit 26 and outputs SG 35, DCHG 36 and CHA 37 as detection instruction signals for the burst signal detector 22 in the signal processing device 12 based upon these signals. The sequencer 23 generates IDXMF 58 representing that the leading position of the track was detected to a sector pulse (SCTP), generating circuit 32 (which will be described hereafter) if it detects IDXM 76.

The servo control unit 4 converts the above mentioned Aout 38 into a digital value by using an A/D converter 24 and each digital value is kept in a burst register (A, B, C, D) 25 so that it can be read by the CPU 5. A gray code converter 27 and current servo address latch 28 are provided to determine the cylinder address (CYL) 63 and the servo sector address (SSA) from the read data pulse (RDP) 39. Writing of data into these burst registers (A,B,C,D) 25 or the current servo address latch 28 is conducted in response to a Write instruction signal (BSTLT 90 or SADRLT 94) from the servo control sequencer 23.

The servo sector address (SSA) 64 is transferred to a data sector information table 31, which in turn outputs the address (DSA) 41 of the data sector 79 which follows the servo sector 78 corresponding to each SSA 64, the position of a sector pulse (SCTP) 42 representing the leading position of next data sector 79 and the leading position of the next servo sector 78.

The sector pulse (SCTP) generating circuit 32 generates an SCTP42 in the SCTP 42 generating position shown in its table 31 and also generates an index pulse (IDXP) 43 from the IDXMF 58 which is generated in the servo control sequencer 23. The data sector address generating circuit 33 outputs a data sector address (DSA) 41 shown in its table 31. A split length generating circuit 34 outputs position information (SPTL 40) for temporarily suspending data processing in a data sector 79 which is disposed just before the next servo sector 78.

The CPU I/F circuit 93B is a circuit for causing CPU 5 to access to a register in the servo control unit 4 and is connected to a CPU address/data bus 91 as shown in FIG. 2.

FIG. 5 is a block diagram showing the configuration of the drive I/F control unit 6. The drive I/F sequencer 46 controls timing of inputting and outputting of signals to and from the drive I/F control unit 6. An ID/DATA comparator 47 determines as to whether or not the DSA which is detected in the servo control unit 4 matches the DSA which is requested by the sequencer 46. If the result of comparison shows a match, a data transfer unit 49 transfers data to the buffer control unit 9 from the signal processing device 12 and vice versa on request of data read and write operations, respectively.

If the servo sector 78 is disposed in the length of the data sector 79, the processing suspending circuit 48 generates a split enable signal (SPTEN 80) in response to a processing suspension instruction signal from the SPTL 40 generated in the servo control unit 4 and SG 35 and feeds it to each circuit. The CPU I/F circuit 93C is a circuit for causing the CPU 5 to conduct an access to a register in the drive I/F control unit 6 as is similar to the servo control unit 4 and is connected to a CPU address/data bus 91 as shown in FIG. 2.

In the above-mentioned prior art disk device 1, the burst signal (Aout 38) which is read from the recording medium 15 and output from the signal processing device 12 is an analog value as is disclosed in, for example, Japanese Unexamined Patent Publication No. Sho 57-86910. Accordingly, it is necessary to convert this signal into a digital signal. This A/D conversion has heretofore been conducted by the servo contort unit 4 having an A/D converter 24 as shown in FIG. 4 or a single A/D converter.

If the A/D conversion of the burst signal is conducted in the servo control unit comprising an LSI incorporating the A/D converter 24 therein as shown in the drawing, similarly to the above-mentioned prior art, the analog signal would be processed in the servo control unit. The servo control unit is a digital (logical) circuit excepting the A/D converter 24. Operation noise will give an adverse influence to the A/D converter 24. Accordingly, the number of steps for designing the servo control unit would be increased or a countermeasure circuit would be necessary when the LSI of the servo control unit is designed in order to eliminate the problem of noise. This results in an increase in manufacturing cost. Incorporation of the A/D converter 24 makes it difficult to achieve a reduction in size, which is achieved by an improvement in the process of manufacturing the LSI. Use of a single A/D converter will increase the number of parts of the electronic circuit. This is not a good idea.

A case in which the A/D converter 24 and the burst register 25 are incorporated in the signal processing device 12 will be considered. Although the above-mentioned problem are mitigated in this case, the CPU 5 should be able to read the burst registers (A, B, C, D) 25 which are shown in FIG. 4. If the CPU serial I/O 92 shown in FIG. 2 is used at this time, it would take a longer period of time to read the burst registers so that it is not suitable for fast servo control.

If the CPU address/data bus 91 shown in FIG. 2 is used, reading of data could be conducted in a parallel manner and a terminal for connecting the CPU address/data bus 91 to the signal processing device 12 would be necessary. Accordingly, the number of terminals of the large scale integrated signal processing device 12 would be remarkably increased.

Another problem will occur in this case. The CPU 5 accesses to the burst register 25 and various registers which are disposed in the data processing unit 3. Since the values on the CPU address/data bus 91 will change to various values, digital noise will occur in the signal processing device 12. There is a risk that the A/D converter 24 of the signal processing device 12 will malfunction due to influence of the noise. In order to prevent this malfunction, the price of the device may increase due to additional circuits.

A prior art method of generating a head position signal which is another object of the present invention will now be described.

A further format of the disk device adopting the data surface servo system of the general disk device is shown in FIGS. 6A, 6B and 6C.

A track 201 comprises a servo sector 202 in which head positioning information is stored and a data sector 203 in which user's data is stored.

The servo sector 202 comprises a Servo Sync 204 for synchronizing the circuits of a servo signal, Servo Mark 205 for decoding the servo signal, Index Sector Mark 206 for determining whether the servo sector in interest is an index sector, Cylinder Address 207 which is representative of a cylinder number and is usually recorded by a gray code, Head Address 208 representative of a head number, Servo Sector Address 209 representative of the servo sector address in the track, and check code CRC 210 for detecting a read error of 208 to 209. The addresses which are denoted as 207 to 210 are generally referred to as "track number area 216". The servo sector 202 further includes a positional signal area 217 for positioning the head, which is behind the track number area 216. The positional signal area 217 comprises Positions A to D (211 to 214) which are burst signals. A Gap 215 is provided as a gap of an interface with the data sector behind the positional signal area 217.

The data sector 203 comprises a Data Sync 220 for synchronizing the circuits of the User Data 222 which follows, Data Mark 221 representative of the timing to decode the User Data 222, ECC 223 for checking whether there is an error in the User Data 222, and Pad 224 for absorbing the delay of data occurred from HDC to the medium. A gap of interface of following data sector or servo sector is a Gap 215. Thus, a general format has been described.

Now, the manner how the storage device will conduct positioning of a head by using a servo sector will be described with reference to the diagram of FIG. 7 illustrating a method of decoding the positional signal.

A case in which the head 304 reads the servo sector 202 will be described. It is presumed that the head 304 is a dual head in which a write head 305 and a read head 306 are separately provided.

As mentioned above, the servo sector 202 includes the track number area 216 and the positional signal area 217. When the head 304 passes a track n, read head 306 reads information stored in the track number area 216. Then, the storage device will recognize the number of the track through which the head 304 passes at this time based upon this information.

The storage device detects the offset of the head 304 from the track n of interest, based upon an output signal from the real head 306 when it passes the positional signal area 217. In other words, when the head 304 passes through the positional signal area 217 (POSA-POSD), a read signal shown in FIG. 9 is detected. The storage device detects the peak value of the signal and generates Va to Vd by holding its maximum value. The microcomputer of the storage device can accept the positional information by the A/D converter accepting this voltage Va to Vd and by determining the positional signal. In the case shown in the drawing, the head can be positioned in a target track by positioning so that Va−Vb=0.

A R/W channel will be described with reference to FIG. 8.

During a data write operation, write data is fed to the R/W channel from HDC 701 together with a write request. A write system circuit 702 conducts encoding of the write data which is suitable for writing to the medium. Thereafter, the write system circuit 702 feeds the encoded data to the head 304 via a head amplifier 703. The head 304 writes this data into the medium.

During a data read operation, the head 304 reads data from the medium after completion of positioning of the head on the track of interest. The read out signal is input to the R/W channel via the head amplifier 703.

After the amplitude of the signal is kept at a constant level by a VGA 704 (Variable Gain Amplifier) which keeps the amplitude of the read out signal at a prescribed level, and the noise component is eliminated in an LPF 705 (Low Pass Filter), the signal is converted digital form by an ADC 706 (Analog to Digital Converter). Then the data is PR (Partial Response) equalized by a PR equalizer 707 and is input to a Viterbi decoder 709. Thereafter, in order to decode the signal which has been subjected to encoding suitable for recording in the medium during the write operation, the signal is passed through the decoder 15 circuit 710 for decoding the encoded data. Then, read the out data is fed to HDC 701. A PLL 711 is provided for synchronization of the read out signal.

Holding of the peak value of the above-mentioned Va to Vd (POSA to POSD) is conducted by a peak hold (PEAK HOLD) circuit 712 in accordance with the timing of an external control circuit (Charge: CHA signal). Then, the servo control circuit (note: HDC 701 incorporates this servo control circuit therein in the case of FIG. 8) accepts a peak value which is determined by peak hold (PEAK HOLD) circuit 712. This acceptance is carried out after the signal has been converted into digital form by an A/D converter. The servo control circuit conducts an operation for positioning control of the head by using the digitally accepted peak value as positional information.

Technology which is related with generation of such a positional signal is disclosed in, for example, the above-mentioned Japanese Unexamined Patent Publication No. Sho 57-86910.

In the prior art, the positional information is obtained by simply detecting a peak voltage of a positional signal as shown in a block diagram of positional signal decoding in FIG. 9. Therefore, there is a problem that if a noise component 401 is superposed on the peak of the positional signal, VI rather than V in FIG. 9 may be treated as a peak value of the positional signal.

It is necessary to extend the duration of the positional signal for detection of the peak in order to extend the time constant of the peak hold circuit for noise reduction. Accordingly, the servo sector area should be increased. This leads to an extension of the time constant, an increase in the number of parts for servo control, a reduction in storage area for data, and a reduction in format efficiency of the medium.

SUMMARY OF THE INVENTION

Accordingly, it is an object of the present invention to provide an economical and highly reliable disk device in which the above mentioned problems are overcome by optimizing the configuration of the circuit in the disk device to provide a lay-out having a high noise margin.

It is another object of the present invention to provide a disk device or an electronic circuit for the disk device in which its cost is reduced by optimizing the configuration of circuits of the signal processing device, servo control unit and drive I/F control unit.

It is a further object of the present invention to provide a disk device or an electronic circuit for the disk device in which a high reliability is provided by optimizing the configuration of circuits of the signal processing device, servo control unit and drive I/F control unit.

It is a further object of the present invention to provide a disk device or an electronic circuit for the disk device in which the increase in the number of terminals of the LSI of the signal processing device for analog to digital conversion of the burst signal is suppressed.

It is a further object of the present invention to provide a disk device or an electronic circuit in which its reliability is enhanced by suppressing occurrence of noise when analog-digital conversion of the burst signal is conducted in the signal processing device.

In a first aspect of the present invention, there is provided a disk device, comprising a recording medium having a recording surface including a data block and servo block thereon, said servo block having servo data recorded therein for controlling the position of a head, on said recording surface, which records and reproduces data in said data block; a signal processing device for detecting data in said data block from a signal read from said recording medium and for outputting said detected data via a first bus; a data processing device for controlling the position of the head on said recording surface, which records/reproduces data in said data block and for reading said reproduced data via said first bus in response to said servo data which is detected from the signal read out from said recording medium; and a processor for controlling said signal processing device and data processing device; said signal processing device including an analog-to-digital converter for analog-to-digitally converting a servo burst data signal read out from said head, and selecting means for outputting to said first bus said servo burst data which is detected from said read signal and converted by said analog-to-digital converter; said data processing device including means for holding said servo burst data which is input via said first bus and means for outputting said held servo data to a second bus.

The signal processing device may preferably further include means for detecting the address of said servo block from said read signal, said selecting circuit being adapted to output the address of said detected servo block to said first bus; and said data processing device may further include means for holding the address of said servo block which is input via said first bus and means for outputting the address of said held servo block to said second bus.

The data processing device of the present invention may further include means for calculating positional information of at least one of a sector pulse representative of the leading position of said data block, the address of the data block and the servo block from the address of said servo block which is input via said first bus.

The signal processing device may further include a register to and from which writing and reading can be performed via said first bus. The data processing device may include an access means for accessing a writable and readable register in said signal processing device via said first bus from said second bus. The processor is adapted to access said writable and readable register in said signal processing device by using said access means.

In a second aspect of the present invention, there is provided a signal processing device having a recording medium having a recording surface including a data block and servo block thereon, said servo block having servo data recorded therein for controlling the position of a head, on said recording surface, which records and reproduces data in said data block, said signal processing device for detecting data in said data block from a signal which is read from said recording medium and, for outputting said detected data via a first bus, comprising an analog-to-digital converter for analog-to-digitally converting a servo burst data signal which is read out from said head; and selecting means for outputting to said first bus said servo burst data which is detected from said read out signal and is converted by said analog-to-digital converter.

The analog-to-digital converter may analog-to-digitally convert data in said data block which is detected from said read signal.

The selecting means of the present invention outputs said servo data to said bus for a period of time at which a servo gate to instruct processing of said servo block is asserted and outputs data in said data block to said bus for a period of time at which a read gate to instruct a read operation of said data block is asserted.

The signal processing device may further include means for detecting the address of said servo block from said read out signal, said selecting means outputting the address of said detected servo block to said first bus.

The selecting means outputs the address of said servo block or the result of the analog-to-digital conversion of said burst signal to said first bus for a period of time at which a servo gate to instruct processing of said servo block is asserted, and outputs data in said data block to said first bus for a period of time at which a read gate to instruct a read operation of said data block is asserted.

In a third aspect of the present invention, there is provided a data processing device for reading, via a first bus, data in said data block which is read and reproduced from a recording medium having a recording surface including a data block and servo block thereon, comprising means for holding a servo burst data in said servo block, which is input via said first bus; and means for outputting said held servo data to a second bus.

The data processing device of the present invention calculates positional information of at least one of a sector pulse representative of the leading position of said data block, the address of the data block and the servo block from the address of said servo block which is input via said first bus.

It is a further object of the present invention to provide a storage device and a method of producing positional information of a head which has a high immunity against noise and is capable of detecting a positional signal in a high accuracy.

In a fourth aspect of the present invention, there is provided a storage device having at least a capability of reading a signal from a recording medium having positioning information and desired data recorded thereon by means of a head, comprising a processing circuit for obtaining positional information representative of the position of said head based upon a positional signal which is obtained by reading said positioning information by said head; and drive means for moving and positioning said head based upon said positional information which is obtained by said processing circuit, said processing circuit obtaining said positional information by performing a predetermined averaging processing of said positional signal which is read by said head.

In a fifth aspect of the present invention, there is provided a storage device having at least a capability of reading a signal from a recording medium having positioning information and desired data recorded thereon by means of a head, comprising a processing circuit for obtaining positional information representative of the position of said head based upon a positional signal which is obtained by reading said positioning information by said head; and drive means for moving and positioning said head based upon said positional information which is obtained by said processing circuit, said processing circuit including A/D converting means for digitizing said analog positional signal which is read by said head and obtains said positional information based upon the positional signal which has been digitized.

In the fifth aspect of the present invention, the present invention may further include features as follows:

The processing circuit may preferably include a PR equalizer at the rear stage of said A/D converting means and obtain said positional information based upon an output value of said PR equalizer.

The processing circuit may preferably include means for changing the input sensitivity of said A/D converting means.

The sensitivity changing means may preferably change said input sensitivity in response to a separately input instruction.

The processing circuit may preferably perform averaging processing of said positional signal which has been digitized and obtain said positional information based upon a value which is obtained by said averaging processing.

In the fourth and fifth aspect, the present invention preferably includes features as follows:

The averaging processing may preferably obtain an average value of peak values of said positional signal.

The averaging processing may preferably obtain an average value of peak-to-peak values of said positional signal.

The averaging processing may preferably obtain a square average value of peak values of said positional signal.

The processing circuit may preferably perform said averaging processing of only peak values which are larger than a predetermined value.

The processing circuit may preferably perform said averaging processing of only peak values which are larger than a predetermined value.

The processing circuit may include a PR equalizer and a learning circuit having an averaging circuit for optimizing said PR equalizer, said averaging processing being performed by the averaging circuit of said learning circuit.

In a sixth aspect of the present invention, there is provided a storage device having at least a capability of reading a signal from a recording medium having positioning information and desired data recorded thereon by means of a head, comprising a processing circuit for obtaining positional information representative of the position of said head based upon a positional signal which is obtained by reading said positioning information by said head; and drive means for moving and positioning said head based upon said positional information which is obtained by said processing circuit, said processing circuit determining an area of said positional signal which is read by said head and determining said positional information based upon a value which is obtained by said area.

The processing circuit in the fourth, fifth and sixth aspects may include a register for storing the operating conditions of said processing circuit and a port used for presetting said register, and output said positional information externally of said processing circuit via said port.

The port may be a serial port.

In a seventh aspect of the present invention, there is provided a method of generating a positional signal of a head in a storage device in which a head is positioned based upon positional information which is obtained from a positional signal which is obtained by reading positioning information from a recording medium having the positioning information and desired data recorded thereon by means of said head, comprising the steps of performing an average processing of values in a predetermined area of said positional signal which is read by said head; and obtaining said positional information based upon a value which is obtained by said averaging processing.

Operation in each of the above-mentioned aspects will be generally described.

The processing circuit performs averaging processing of a positional signal (for example, an operation of an average value of peak values, operation of an average value of peak-to-peak values and an operation of square average of peak values) and obtains positional information based on a value which is obtained by the averaging operation. In this case, the averaging processing may be performed over only peak values which are larger than a predetermined value. It may be performed after the positional signal has been digitized by A/D converting means. If a PR equalizer is provided at a stage subsequent to the A/D converting means, the averaging processing may be performed over an output value of the PR equalizer. If the processing circuit includes a PR equalizer and a learning circuit having an averaging circuit for optimizing the PR equalizer, an increase in the number of circuits is prevented by performing the averaging processing by the averaging circuit of the learning circuit.

If the input sensitivity of the A/D converting means is changed by sensitivity changing means according to needs (or according to a separately input instruction, as the case may be), the positional information could be obtained in an optimum precision each time. The resolution per LSB of the A/D converting means can be changed depending upon the amplitude value of the positional signal.

Alternatively, an area integration of the positional signal may be conducted to obtain the positional information based on the integrated value. Since the area of noise is generally very small, the positional information can be obtained without being influenced by noise.

The processing circuit outputs the thus obtained positional information to an external circuit via a port (which may be a serial port) used for presetting a register for storing operation conditions of the processing circuit. This obviates the necessity to newly provide a port for outputting the positional information.

Drive means performs movement and positioning of a head based upon the thus obtained positional information.

BRIEF DESCRIPTION OF THE DRAWINGS

FIG. 5 is a block diagram showing the configuration of a prior art drive I/F control unit;

FIG. 7 is views showing a prior art method of decoding a positional signal;

DESCRIPTION OF THE PREFERRED EMBODIMENTS

Now, a first embodiment of the present invention will be described with reference to the drawings.

Figure 3:
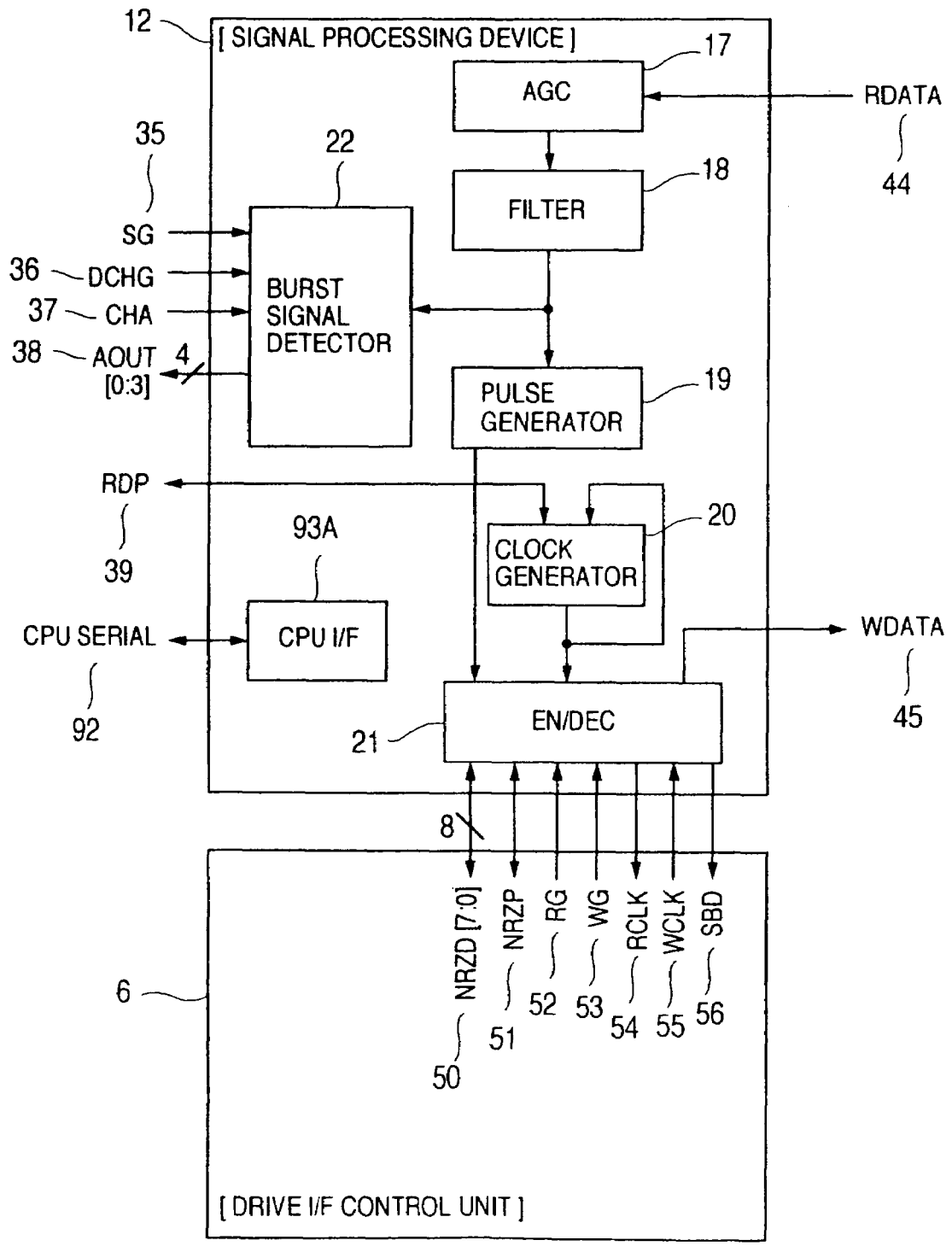
FIG. 3 is a block diagram showing the configuration of a prior art signal processing device.
Figure 10:
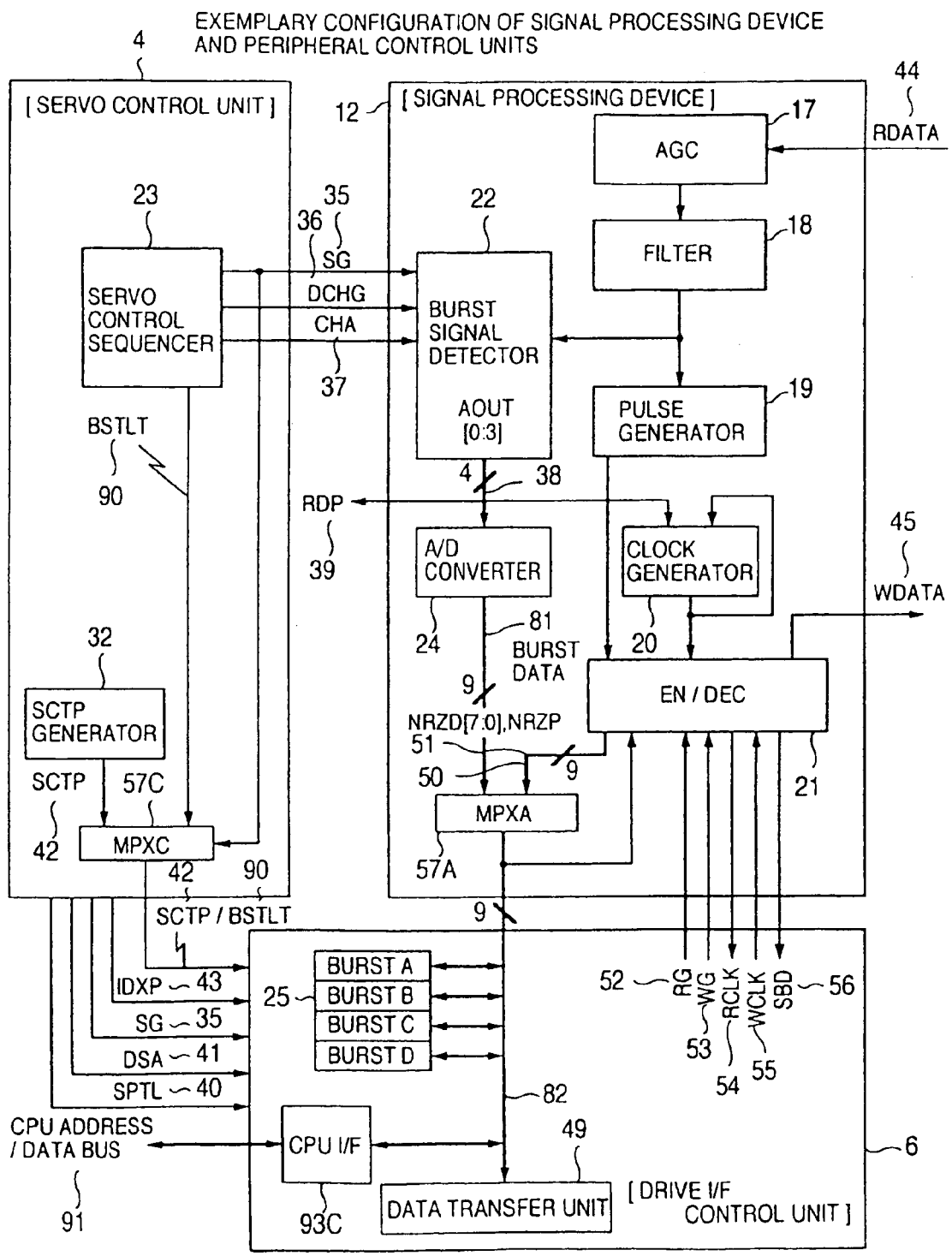
FIG. 10 is a block diagram showing the configuration of a first embodiment of the present invention.

FIG. 10 shows an example of the circuit configuration of a signal processing device 12, servo control unit 4 and drive I/F control unit 6, to which the present invention is applied. In the signal processing device 12 of FIG. 10, components which are like to those shown in FIG. 3 are designated by like numerals. The signal processing device 12 of the present invention is added with an A/D converter 24 and MPXA (multiplexer) 57A. A reference numeral 81 denotes a burst data which is obtained by A/D converting a burst signal Aout 38.

In order to feed to the CPU 5 a burst data 81, a digital value which has been converted by the A/D converter 24, said burst data 81 is fed to the drive I/F control unit 6 of the disk control device 2 via a signal line (hereafter referred to as "NRZ data bus 82) for feeding NRZD 50 and NRZP 51, and an MPXA 57A. The drive I/F control unit 6 is provided with a burst register 25 for holding the burst data 81. The CPU 5 recognizes a burst data by accessing to the burst register 25 via a CPU I/F circuit 93C of the drive I/F control unit 6.

A method of notifying the drive I/F control unit 6 of the burst data 81 will be described in detail. MPXA 57A of the signal processing device 12 selects either one of the burst data 81 output from the A/D converter 24 or read data (NRZD 50, NRZP 51) which is output from EN/DEC 21, and outputs the selected one to the drive I/F control unit 6 of the disk control device 2. The drive I/F control unit 6 determines whether the accepted data is the burst data 81 or read data (NRZD 50, NRZD 51) by a method which will be described hereafter, and feeds the data to the burst register 25 or the data transfer unit 49.

Incorporation of the A/D converter 24 enables Aout 38 of the analog value detected by the burst signal detector 22 to be directly output to the A/D converter 24. Thus, deterioration of quality of the signal Aout 38 due to influence of noise on the electronic circuit board can be minimized, so that a more precise head positioning control can be achieved.

Figure 11:
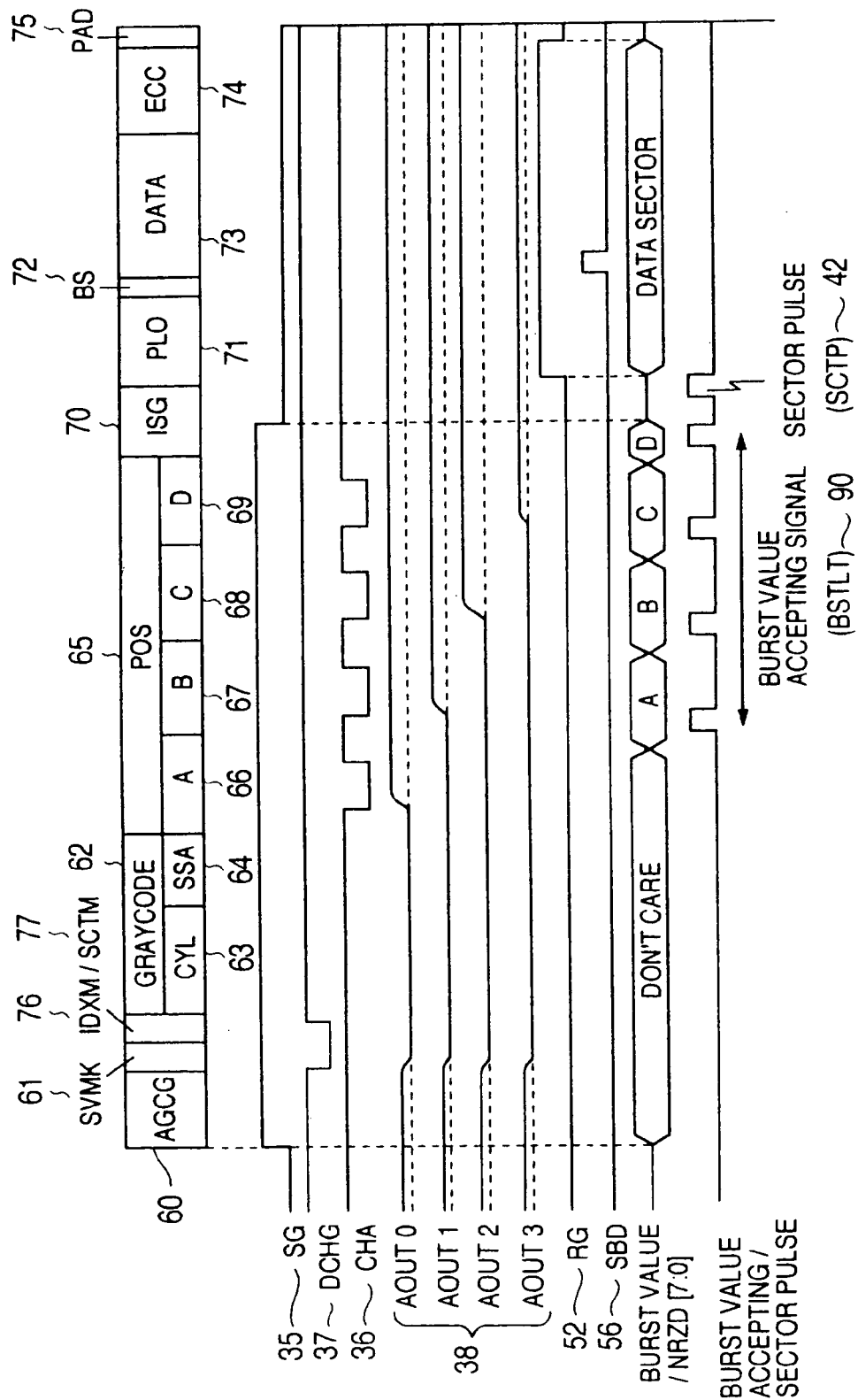
FIG. 11 is a chart showing the interface timing relationship in the first embodiment of the present invention.

FIG. 11 shows an example of the interface timing relationship among the signal processing device 12, drive I/F control unit 6 and the servo control unit 4. The configuration of the servo control unit 4 in the present invention is identical with that of the prior art of FIG. 8 excepting that the A/D converter 24 and the burst registers (A, B, C, D) 25 are omitted and an MPXC 57C (which will be described hereafter) is added. In this case, the servo control unit 4 having no analog circuit and the drive I/F control unit 6 can be integrated into a single LSI.

The servo control unit 4 outputs a servo gate signal (SG 35), a discharge signal (DCHG 36) and a charge signal (CHA 37) in a timing relationship shown in FIG. 11. The servo gate signal (SG 35) represents that the R/W head 7 has passed through the servo sector (SSCT 78) and is conducting reading of SSCT 78. The discharge signal (DCHG 36) is used for initializing the analog value of each Aout 38 output from the burst signal detector 22. The charge signal (CHA 37) is used to output burst information which is detected on each POS (A66, B67, C68 and D69) to each Aout 38.

The Aout 38 is serially converted into the burst data 38 of digital value by the A/D converter 24 in accordance with CHA 37 and is output to MPXA 57A. In order to output the burst data 81 to the NRZ data bus 82, the MPXA 57A selects the burst data 81 or read data (NRZD 50, NRZP 51) in an assert period of time of the servo gate signal (SG 35) and the read gate signal CRG 52, respectively. The selected burst data 81 or read data is fed to the drive I/F control unit 6 via the NRZ data bus 82.

The data on NRZ data bus 82 includes the burst data 81 and read data (NRZD 50, NRZP 51) on a time-sharing basis. In order to switch the data, the servo control unit 4 outputs in an assert period a burst data acceptance signal (BSTLT 90) which is generated in the servo control sequencer 23 to the control line of the sector pulse (SCTP) 42 and outputs the sector pulse (SCTP) 42 in the other period of time.

In an SG 35 assert period, the drive I/F control unit 6 does not treat the signal as the sector pulse 42, but treats it as the accept signal of the burst data 81 to accept the burst data 81 without increasing the number of terminals and holds it in the burst registers 25 (A, B, C, D).

Since the NRZ data bus is a bilateral bus, the signal processing device 12 and the drive I/F control unit 6 control the bus so that a data flows in a direction from the signal processing device 12 to the drive I/F control unit 6 for an enable period of time of SG 35 and RG 52, in a direction from the drive I/F control unit 6 to the signal processing device 12 for an enable period of time of the write gate (WG 53), and the bus is brought into a high impedance state for a period in which no gates are asserted.

The bus width of the burst data of the present embodiment is assumed as 9 bits. Extension of the bus width can be easily conducted by using the other interface signal. If, for example, NRZ data bus 82 and SBD 56 are simultaneously used, it can be extended to 10 bits. If the bus width of NRZ data is narrower than that of the burst data, the burst data can be transferred on a time-sharing basis.

If the bus width of the burst data is 10 bits and the bus width of the NRZ data is only 2 bits, transfer can be conducted by dividing the burst data into 5 pieces.

If the circuit configuration in the present embodiment is used, writing or reading to and from the register disposed in the signal processing device 12 can be conducted via the CPU I/F circuit 93C of the drive I/F control unit 6 and the NRZ data bus 82 shown in FIG. 10 when the CPU 5 conducts writing or reading to and from the register in the signal processing device 12. Accordingly, the CPU I/F circuit 93A which was necessary in the prior art may be omitted. At this time, the register in the signal processing device 12 is to be accessed by the CPU 5 for a period other than the period of reading or writing operation of the data on the medium. Accordingly, the access to the register has no influence on the A/D converter 24.

Since the terminals for the serial I/O 92 may be omitted, this contributes to reduction in cost of the signal processing device 12. Since access is conducted in a parallel manner, fast register access is made possible to contribute the improvement in the system performance.

Further, since the signal processing device 12 is not directly connected to the CPU address/data bus 91, malfunction of an analog circuit due to influence of the above-mentioned digital noise can be reduced.

Figure 12:
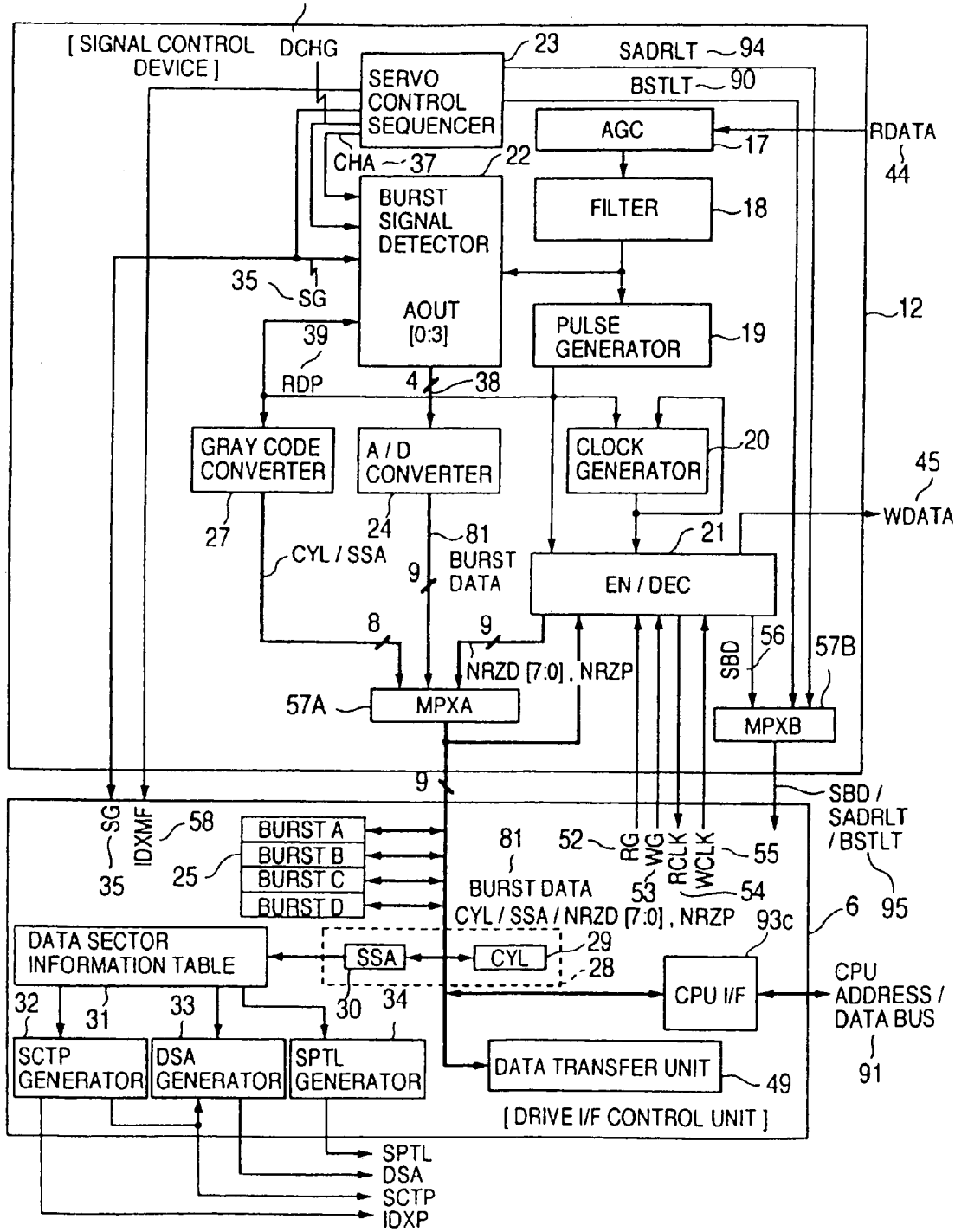
FIG. 12 is a block diagram showing the configuration of a second embodiment of the present invention.

Another embodiment of the present invention will be described. FIG. 12 shows another circuit configuration of the signal processing device 12 and the drive I/F control unit 6 to which the present invention is applied. In comparison of the present circuit configuration of FIG. 12 to that of FIG. 10, the signal processing device 12 is added with the servo control sequencer 23, gray code converter 27, MPXB 57B shown in FIG. 4, and the drive I/F control unit 6 is added with the current servo address latch 28, data sector information table 31, SCTP (Sector Pulse) generator 32, DSA (Data Sector Address) generator 33 and the SPTL (Split Length) generator 34 which are shown in FIG. 4.

Figure 4:
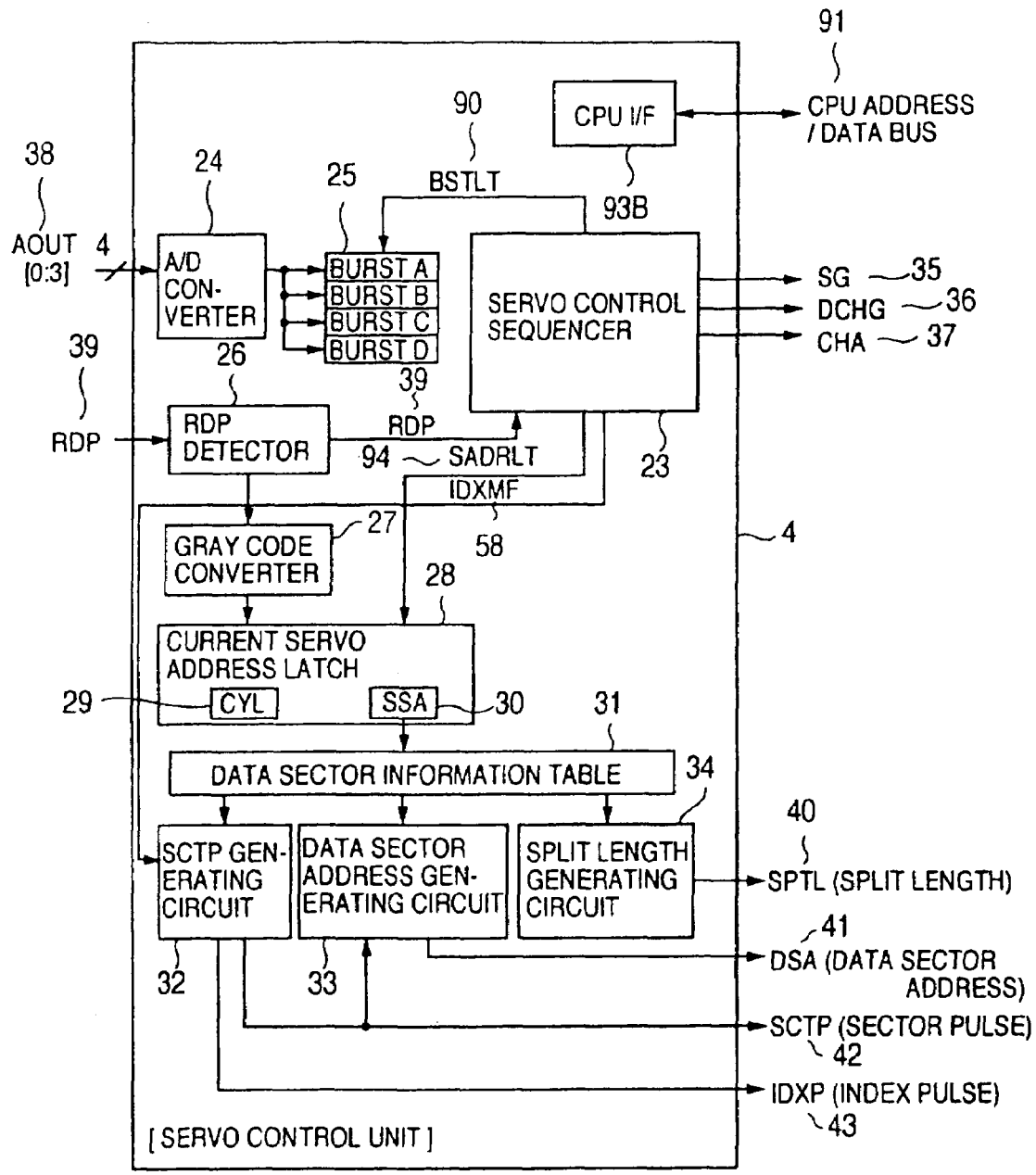
FIG. 4 is a block diagram showing the configuration of a prior art servo control unit.

In the present embodiment, each function shown in FIG. 4 of the prior art is distributed to the signal processing device 12 and the drive I/F control unit 6 to optimize the configuration of the whole circuit. The RDP detector 26 which was necessary to synchronize the operation clock of the servo control unit 4 with the RDP (Read Data Pulse) 39 in the prior art is omitted since the clock which is synchronized with the RDP 39 can be generated in the clock generator 20 in the present embodiment.

Operation of the circuitry of the signal processing device 12, and the drive I/F control unit 6 in a second embodiment will be described with reference to FIGS. 12 and 13.

The signal processing device 12 shown in FIG. 12 has the servo control sequencer 23 incorporated therein and is adapted to generate the servo gate (SG) signal 35, discharge (DCHG) signal 36 and charge signal (CHA) 37 and output them to the burst signal detector 22. The device 12 also generates BSTLT 90 and SADRLT 94 and outputs them to MPXB 57B which will be described hereafter. The gray code converter 27 determines the cylinder address (CYL) 63 and the servo sector address (SSA) 64 from the RDP 39 output from the pulse generator 19 and outputs them to MPXA 57A on a timesharing basis.

The servo control sequencer 23 controls MPXB 57B via SG 35, SADRLT 94, BSTLT 90, and SBD 56, so that a given data is output to the NRZ data bus 82 from the cylinder address (CYL) 63 and the servo sector address (SSA) 64, or the burst data 81 which is an output of the A/D converter, or the read data (NRZD 50, NRZP 51) which are output from EN/DEC 21 in a timing relationship which will be described hereafter.

Figure 13:
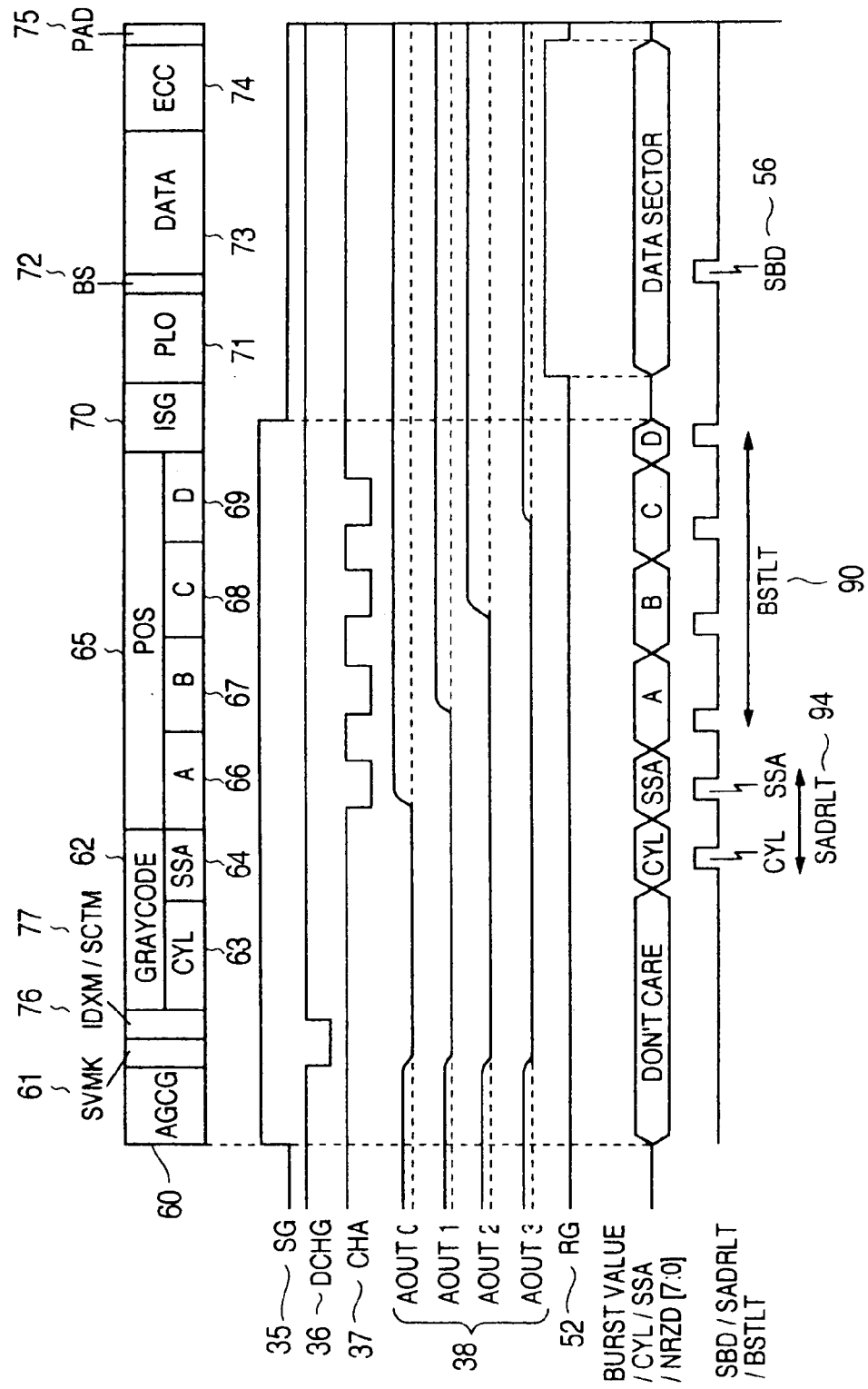
FIG. 13 is a chart showing the interface timing relationship in the second embodiment of the present invention.

In this case, on the side of the signal processing device 12, the servo control sequencer 23 controls MPXB 57B so that SADRLT 94 and BSTLT 90 are output to an SBD/SADRLT/BSTLT control line 95 in a timing relationship shown in FIG. 13 for an assert period of time of the servo gate (SG) 35. For an assert period of the read gate (RG) 52, SBD 56 is output to the same control line 95 similarly to the above mentioned embodiment.

FIG. 13 shows an example of timing relationship of the interface. The present embodiment is different from the former embodiment in that the cylinder address (CYL) 63 and the servo sector address (SSA) 64 are output to the NRZ data bus 82. The data on NRZ data bus 82 includes the burst data 81, cylinder address (CYL) 63, servo sector address (SSA) 64 and the read data (NRZD 50, NRZP 51).

In the present embodiment, discrimination of them is conducted in the drive I/F control unit 6 by regarding that the data represents the cylinder address (CYL) 63, servo sector address (SSA) 64 and the burst data 81 for an assertion period of the servogate 35, and that the data represents the read data (NRZD 50, NRZP 51) for an assert period of the read gate (RG) 52, similarly to the foregoing example.

Acceptance of each data can be conducted without increasing the number of terminals by treating the control line of the prior art SBD 56 as no byte sync detection signal (SBP 56), but as an acceptance signal (SADRLT 94) of the cylinder address (CYL 63), servo sector address (SSA 64) or the acceptance signal of the burst data 81.

Each burst data 81 is held in the burst register 25 in the drive I/F control unit 6 and is accessed by the CPU 5 via the CPU I/F circuit 93C. The values of the cylinder address (CYL) 63 and servo sector address (SSA) 64 are stored in the latch CYL 29 and SSA 30, respectively which are similar to the current servo latch 28 of FIG. 4, by the SADRLT 94.

Figure 1A:
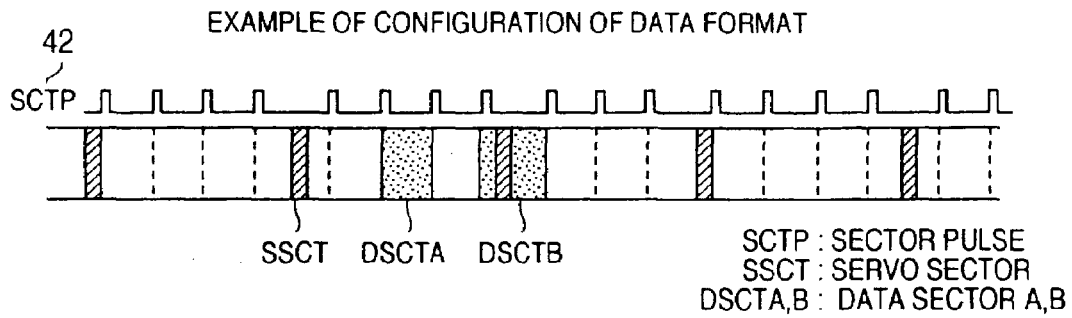
FIGS. 1A, 1B, 1C and 1D are charts showing an example of the configuration of a prior art disk format.
Figure 1B:
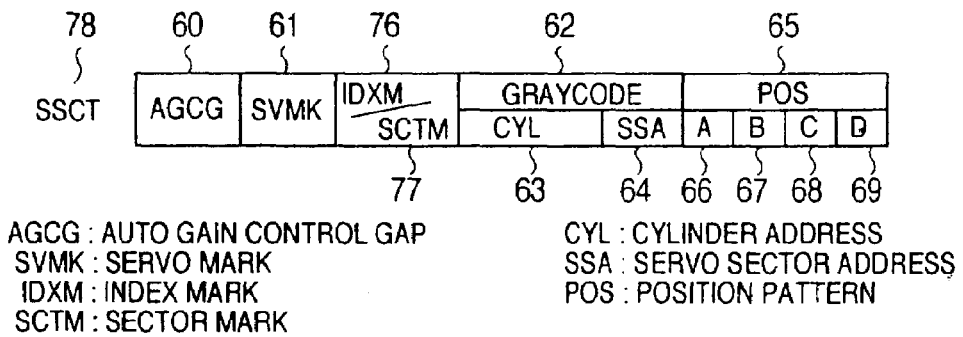
Figure 1C:
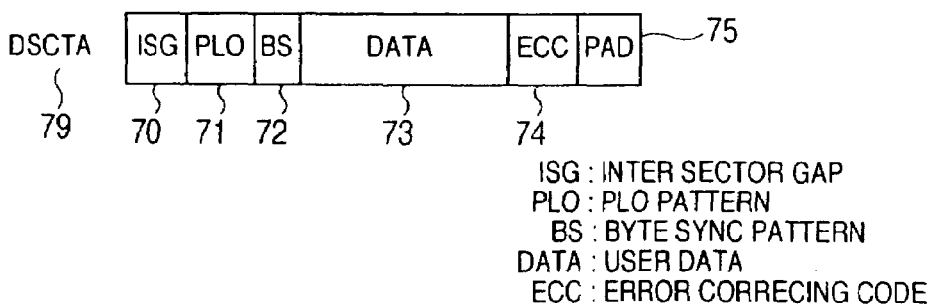
Figure 1D:
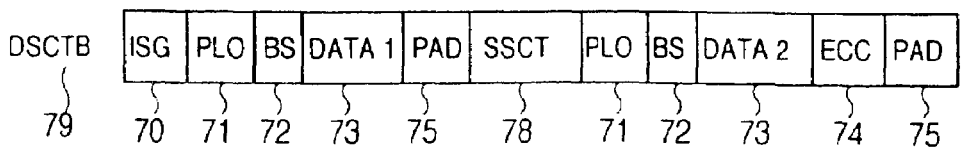
Figure 2:
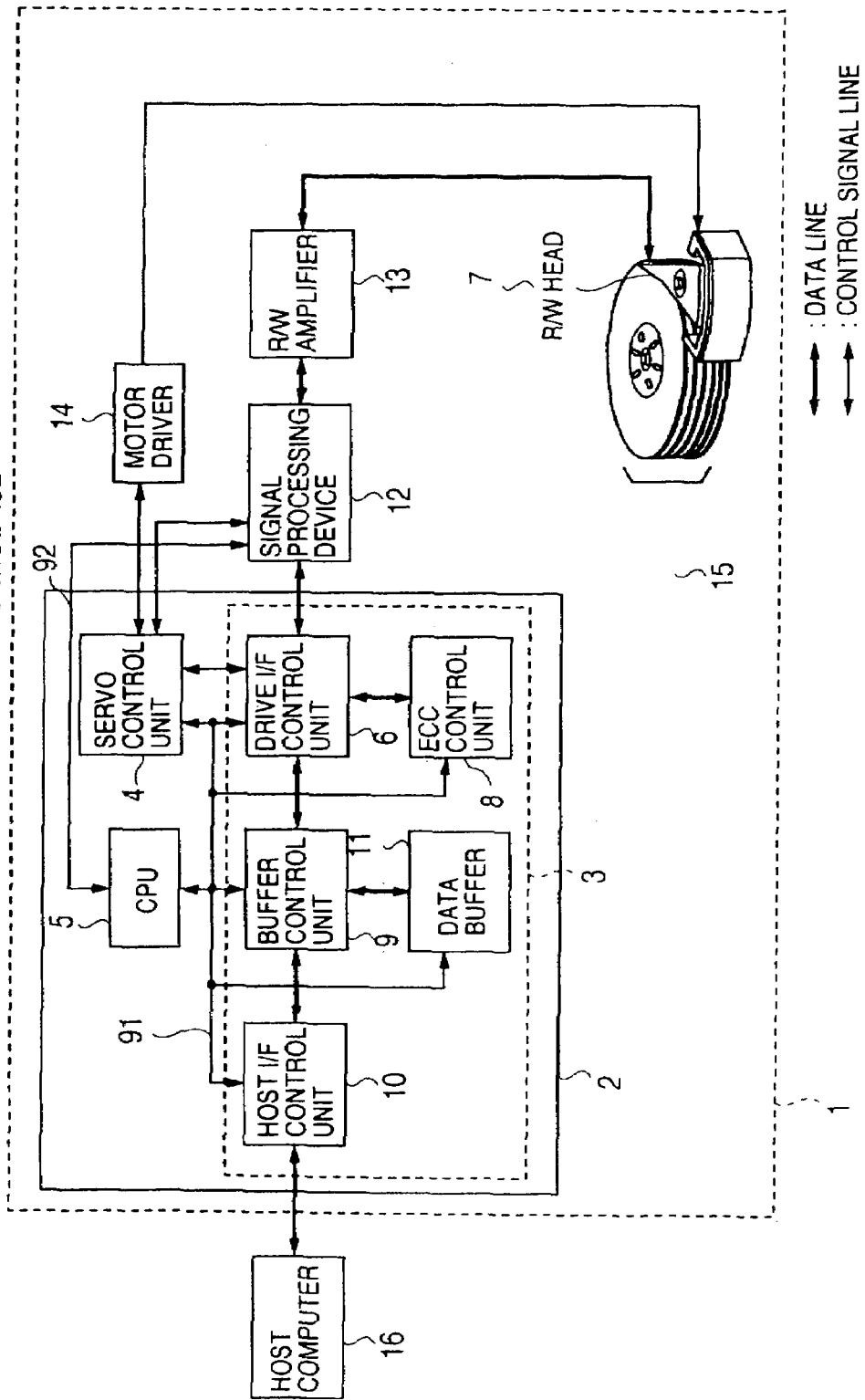
FIG. 2 is a block diagram showing the system configuration of a prior art disk device.

The order of the acceptance signals SADRLT 94, BSTLT 90 of the cylinder address (CYL) 63, servo sector address (SSA) 64, burst data 81 which are output from the signal processing device 12 since the servo gate (SG) 35 is asserted as shown in FIG. 13, is not changed in a desired servo sector SSCT 78 shown in FIG. 1B. Accordingly, the CYL 29, SSA 30, burst A25A, burst B25B, burst C25C and burst D25D are accepted in order of output in the drive I/F control unit 6.

The value of SSA 30 is transferred to the data sector information table 31 so that the sector pulse, data sector address and split information is generated as is described in the prior art and processing of the data sector DSCT 79 is conducted.

Since A/D converter 24 shown in FIG. 10 or 12 may be replaced with the A/D converter 24 which is used in the pulse generator 14, it is suitable for high density integration.

Figure 6A:
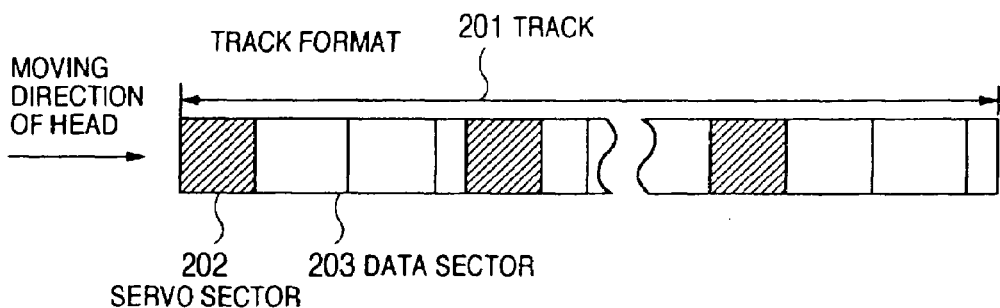
FIGS. 6A, 6B and 6C are charts showing a data decoding format in a prior art magnetic disk.
Figure 6B:
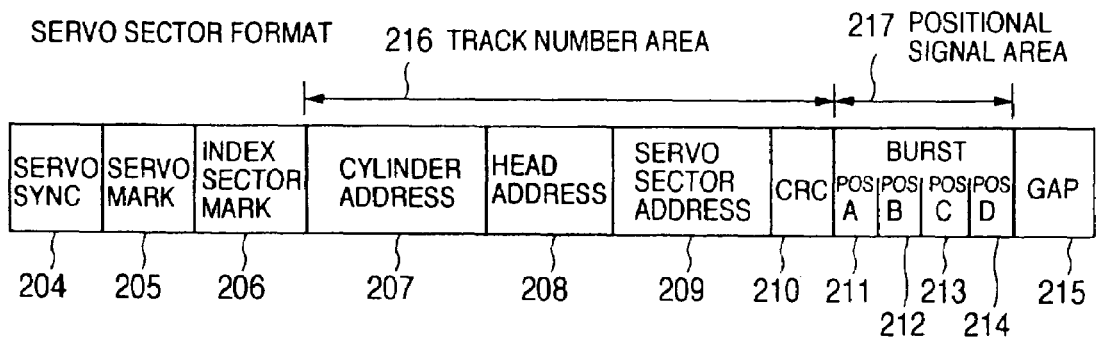
Figure 6C:
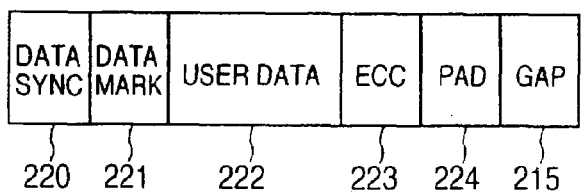

A configuration in which CPU 5 is included in the data processing unit (data processing device) 3 shown in FIG. 6 may be devised. Similar advantages can be provided in that case.

Since the servo data is held in the drive I/F control unit 6, that is, data processing unit 3 in accordance with the present invention as mentioned above, even if digital noise occurs when the CPU 5 accesses the servo data, no adverse influence is given to the signal processing device 12 including an analog circuit, resulting in an enhancement in the reliability of the disk device.

Since the servo data which has been analog-digital converted in the signal processing device 12 is fed to the drive I/F control unit using an existing data bus, the number of the terminals of the signal processing device 12 is not increased. This will not increase the prices of the signal processing device and disk device.

Now, a further embodiment will be described with reference to FIGS. 14 to 21.

Figure 14:
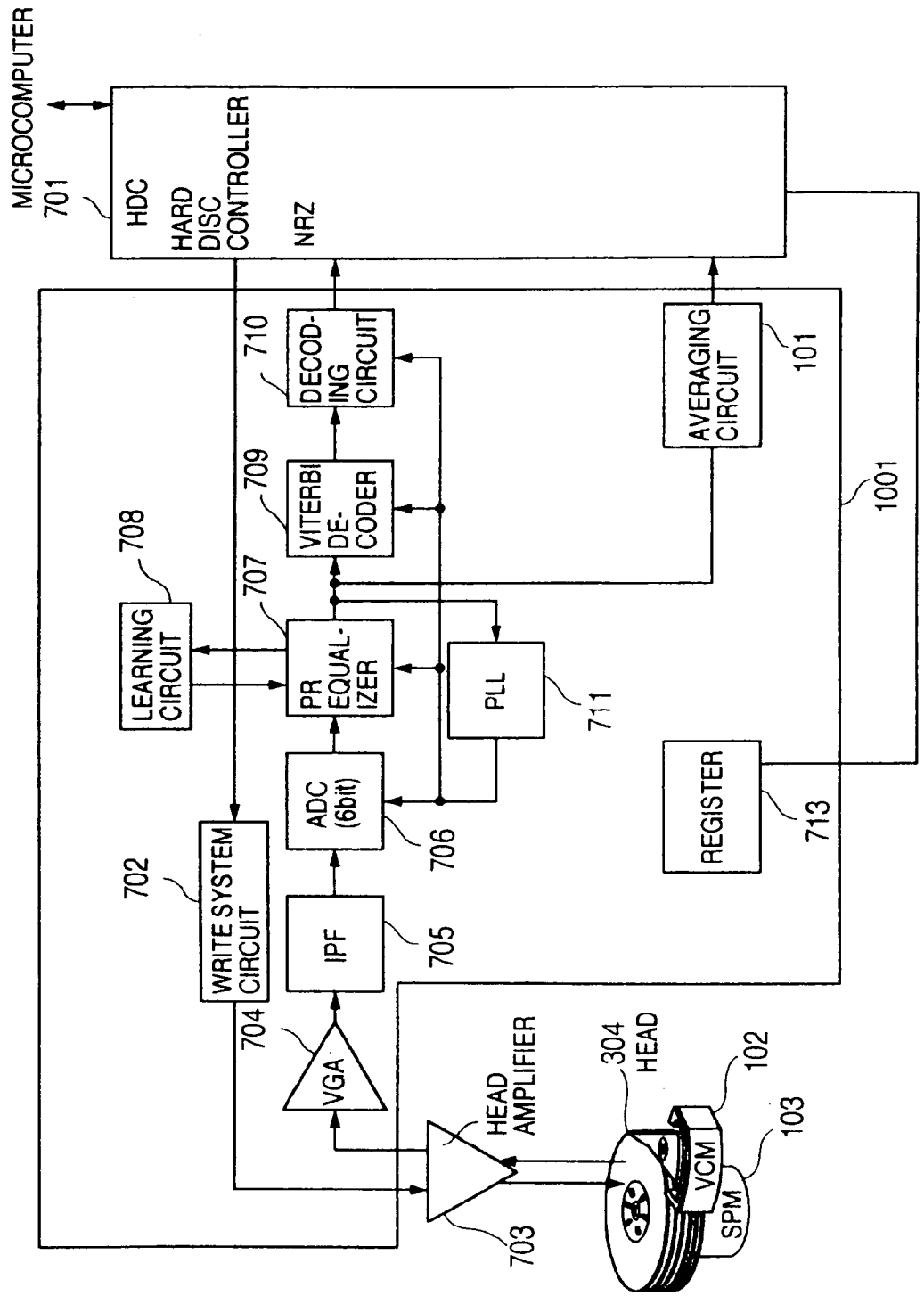
FIG. 14 is a block diagram showing a R/W channel in a magnetic disk device in the embodiment of the present invention.

The configuration of a R/W channel in the magnetic disk device in the present embodiment is shown in FIG. 14.

Figure 8:
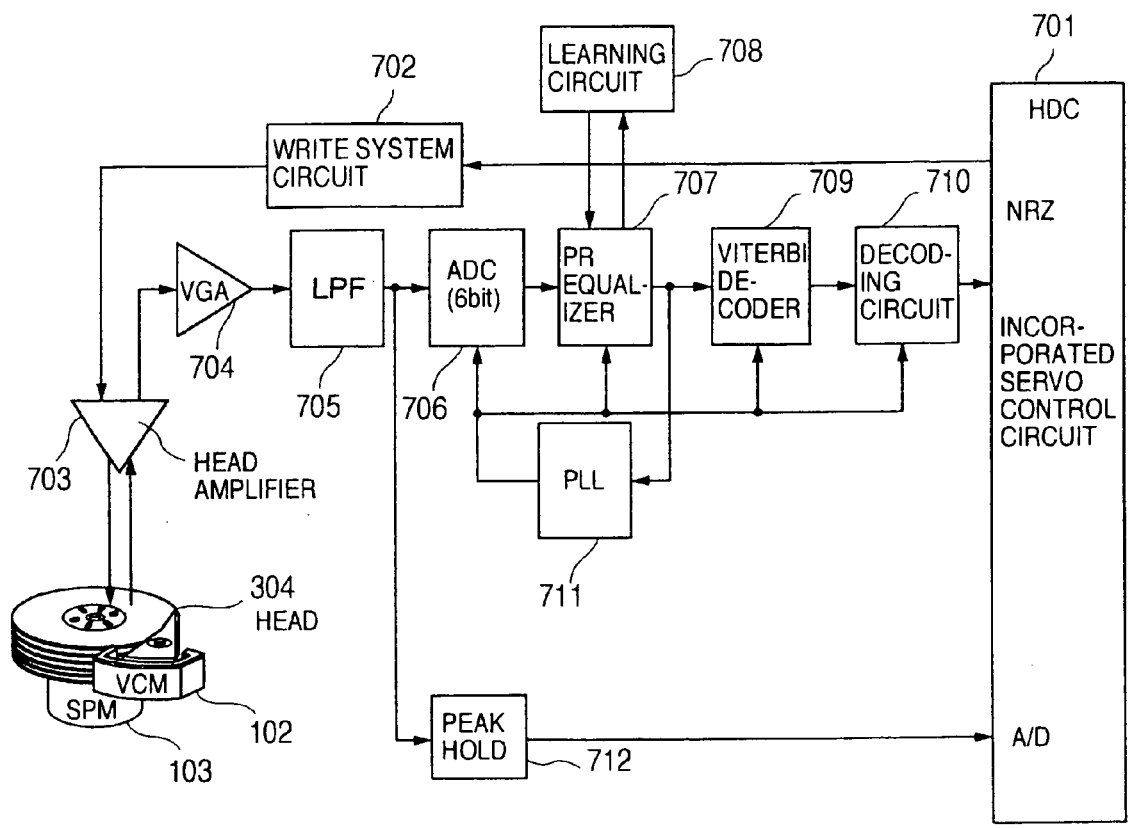
FIG. 8 is a block diagram showing the configuration of a R/W channel in the prior art magnetic disk device.
Figure 9:
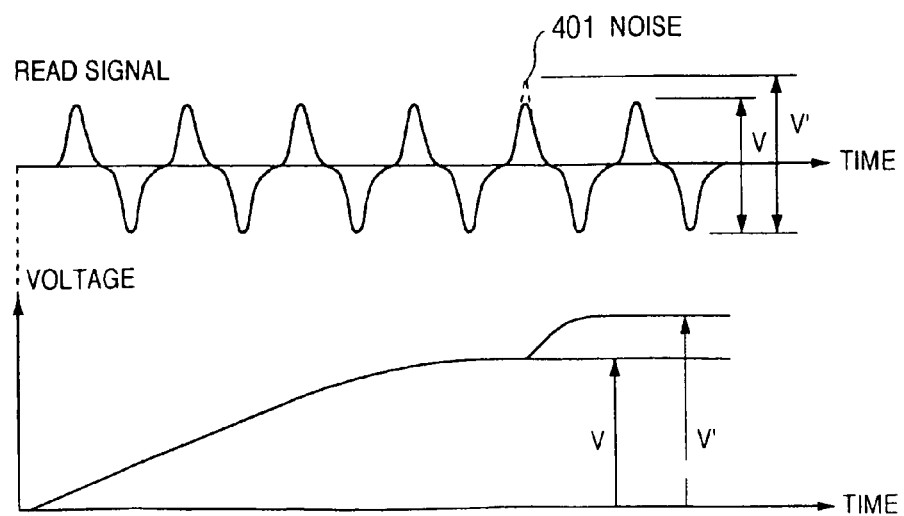
FIG. 9 is a diagram showing the influence of noise in decoding of the positional signal in the prior art.

The R/W channel 1001 comprises an averaging circuit 101 for digitally processing a signal output from a PR equalizer 707 in lieu of the prior art positional signal peak hold circuit 712 (refer to FIG. 8). The averaging circuit 101 provides information on position by conducting an averaging operation of the digitized positional signal. An ADC 706 in the present invention adopts such a sampling method for A/D conversion that it is not influenced by noise. The sensitivity of the ADC is adjustable.

The R/W channel 1001 is made of a single chip.

The present embodiment has features in [1] a way of determining positional information, [2] changing of accuracy of the positional information and [3] terminal for transmitting and/or receiving the positional information.

[1] Way of Determining Positional Information

The way of determining positional information in the present embodiment has features in sampling and averaging of sampled data.

Figure 15:
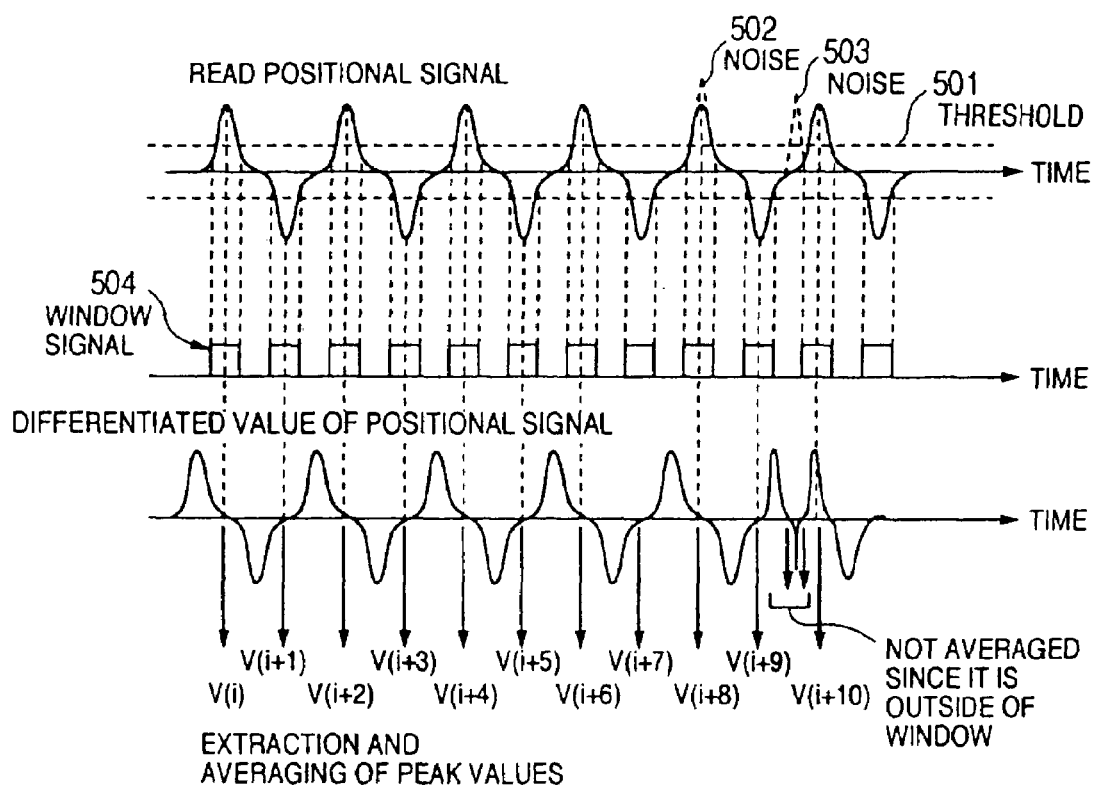
FIG. 15 is a chart showing a method of sampling of the positional signal.

(1) Sampling (Refer to FIG. 15)

A case in which noise 502 and 503 is included in the read out wave form of the positional signal area 217 of the servo sector will be considered. A window signal 504 shown in the drawing is asserted when the read positional signal exceeds a predetermined threshold voltage 501. An area in which this window signal is asserted will hereinafter be referred to as a "Window".

In the present embodiment, peak values are sampled by analog-to-digital converting a positional signal when a differential signal of the positional signal is zero-crossed and the window signal is asserted. Since the noise 502 is within the window in the case of FIG. 15, the peak values which become larger than original values due to influence of noise 502 will be sampled. However, noise 503 will not be accepted on sampling since it is outside of the window. In the sampling, the present embodiment is not influenced by noise occurring at least outside of the window.

The above-mentioned sampling is conducted by the ADC 706 in accordance with an instruction from a PLL 711. Differential operation of the positional signal and generation of window signal which is necessary for sampling is conducted by the PLL (phase locked loop) 711. Since ADC 706 always conducts A/D conversion of the read out positional signal, the averaging circuit 101 per se may extract only a portion which satisfies the above-mentioned requirements from the digitized positional signal.

Data of highly accurate positional information can be obtained by sampling only areas of the positional signal which are essential for calculating the positional information. It is not necessary to sample all peaks of the read out positional signal. It is of course possible that some peaks may be decimated depending upon the rate of ADC 706.

(2) Averaging Processing of Sampled Data.

Noise within a window (noise 502 in a case of FIG. 15) may be sampled in the above-mentioned method. Hence, influence of noise which could not be eliminated is reduced by averaging processing the sampled data.

Various methods for averaging processing are possible. For example, averaging of the absolute values of previous peak values (one side amplitude average, refer to equation 1), peak to peak averaging (both side amplitude average, refer to equation 2), square averaging (refer to equation 3) and square averaging for predetermined reference value (refer to equation 4) are possible.

One side amplitude average (1)
$$Vave\ 1(n) = \frac{|V(i)| + |V(i+1)| + |V(i+2)| + |V(i+3)| + \ldots |V(i+n)t|}{n}$$

Both side amplitude average (2)
$$Vave\ 2(n) = \frac{V(i) + V(i+1) + V(i+2) + V(i+3) + \ldots V(i+n)}{n}$$

square average 1 (3)
$$Vave\ 3(n) = \frac{V(i)^2 + V^2(i+1) + V^2(i+2) + V^2(i+3) + \ldots V^2(i+n)}{n}$$

square average 2 (4)
$$Vave\ 2(n) = \frac{(V(i)-D)^2 + (V(i+1)-D)^2 + (V(i+2)-D)^2 + (V(i+3)-D)^2 + \ldots + (V(i+n)-D)^2}{n}$$

(wherein D denotes a predetermined target value)

D: an integer, n: a positive integer

High quality positional information can be generated by conducting an averaging processing to digitally reduce noise components in the positional signal in such a manner. That is, highly accurate head positioning can be achieved.

It is to be noted that the averaging processing method is not limited to only the above-mentioned methods. Another method may be adopted if it can reduce the influence of noise in the positional signal.

In practice, the above-mentioned averaging processing is conducted by the averaging circuit 101.

Figure 16:
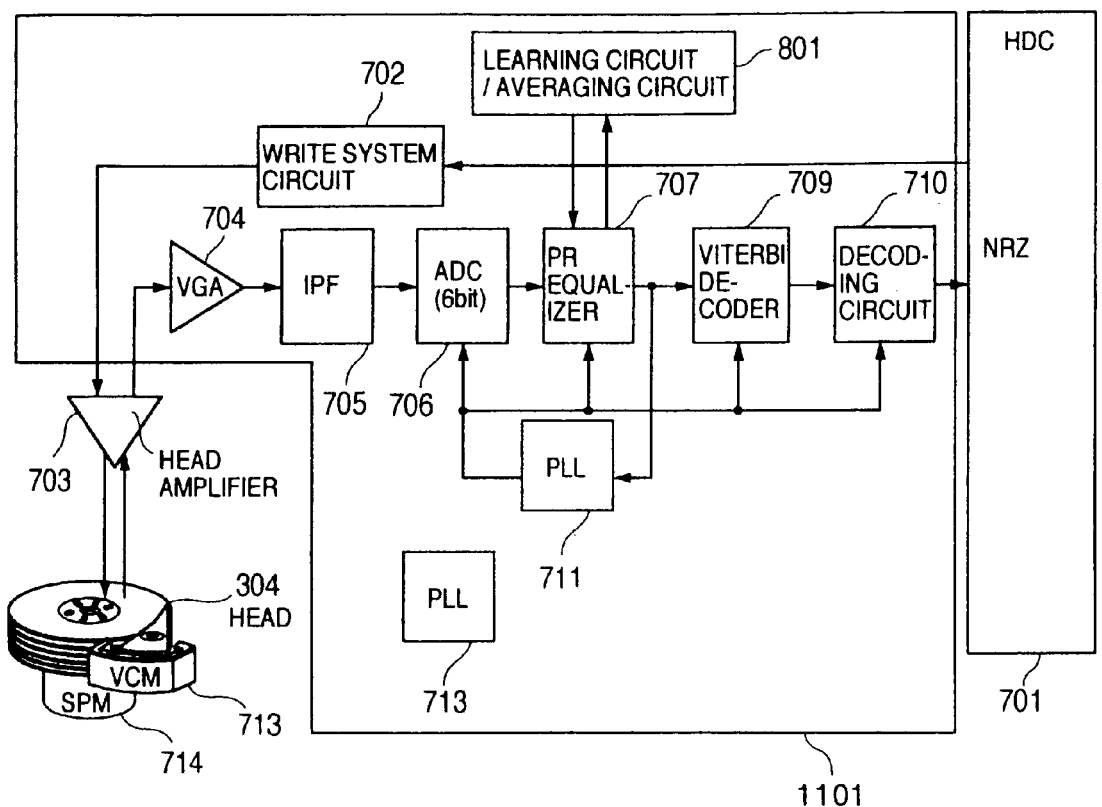
FIG. 16 is a block diagram showing the configuration of a R/W channel including a learning circuit having an incorporated averaging circuit.
Figure 17:
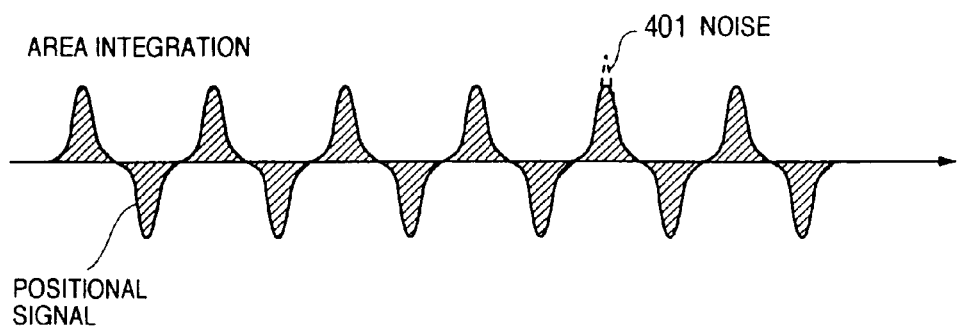
FIG. 17 is a wave form chart showing a method of suppressing the noise influence by an area integration.

The averaging circuit 101 is newly provided in the case of FIG. 14. The R/W channel includes a learning circuit 708. The learning circuit 708 has inherently an averaging circuit for the PR equalizer 707. Since the learning circuit 708 does not always work, averaging of the positional signal may be conducted by using its averaging circuit. To this end, an output signal which is to be input to a Viterbi encoder 709 is required to be input to the averaging circuit of the learning circuit 708 as shown in FIG. 16. Further, it suffices to output the result of averaging processing of the determined positional signal to HDC 701. By so doing, the noise components of the positional signal can be digitally reduced without expanding the circuits, similarly to the foregoing embodiment. Since such a learning circuit and averaging circuit are well known art, detailed description of them is omitted. These circuits are taught in, for example, Mikio Takebe "Digital Technology Series 4, Design of Digital Filter", First Edition, Jan. 25, 1986, Tokai University Publishing Association. The adaptive equalizer which is set forth in chapter 7 of the cited reference is relevant to a learning circuit set forth herein.

The influence of noise may be reduced by conducting an area integration as a method which is different from the above-mentioned sampling and averaging. A method using this area integration will be described with reference to FIG. 17. In this method, positional information is generated by conducting an area integration of the positional signal. The period of the positional signal is kept precisely constant by servo control. An individual peak wave form is scarcely influenced by factors other than the read position. Since the hold period of time of individual noise is generally very short, its area is very small. Accordingly, the area integration of the positional signal has a predetermined correlation with its peak value. Therefore, positional information can be obtained from the area integrated value similarly to a method of obtaining positional information from the peak signal.

The positional information can be generally obtained from the area integrated value by conducting an operation as follows:

|area integrated value of POSA−area integrated value of POSB|×coefficient or

|area integrated value of POSC−area integrated value of POSD|×coefficient

Since positioning is performed after it has been determined whether positioning is conducted at POSA and POSB, or at POSC and POSD, operation of any one of formulae is conducted depending upon the result of the determination.

The positional information need not be calculated by using the above-mentioned formula, but it may be calculated by using a table. In order to accurately obtain the area (that is, positional information), it is necessary that the sampling interval of ADC 706 be sufficiently short in comparison with the period of the positional signal. In a case in which such a technique is applied, the above-mentioned averaging circuit 101 is caused to conduct the above-mentioned area integration.

Figure 18A:
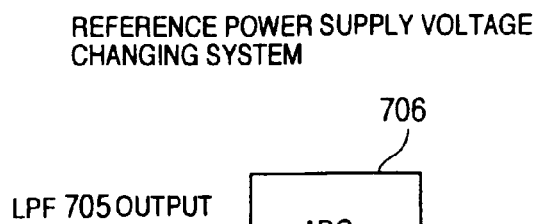
FIGS. 18A and 18B are views showing the configuration of changing the sensitivity of ADC 706.
Figure 18B:
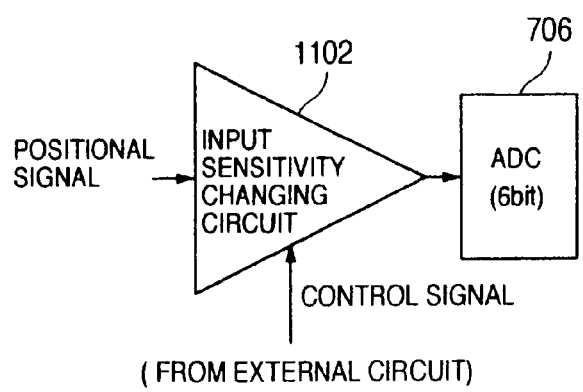

[2] Changing the Accuracy of the Positional Information (Refer to FIGS. 18A and 18B)

Positioning of the head comprises three steps, such as a seeking step at which the head moves coarsely, a settling step at which the head begins to settle on a target track and a following step at which the head has settled on the target track. The amplitude of the positional signal varies depending upon respective steps. The required resolution per LSB of the ADL 706 becomes lower as the step proceeds. It is a head positioning control unit that determines the three steps. Therefore, highly accurate positional information can be generated without increasing the word length (bit width) of A/D conversion by externally adjusting a reference power supply voltage of ADC 706 or input gain depending upon the required A/D conversion sensitivity (that is, the accuracy of the positional information).

In order to achieve this, a reference power supply voltage changing circuit 1101 shown in FIG. 18A or an input sensitivity changing circuit 1102 shown in FIG. 18B is required to be added to the circuit shown in FIG. 14. "Positional signal" shown in FIGS. 18A, 18B means a signal which is output from LPF 705 in FIG. 14.

Figure 19:
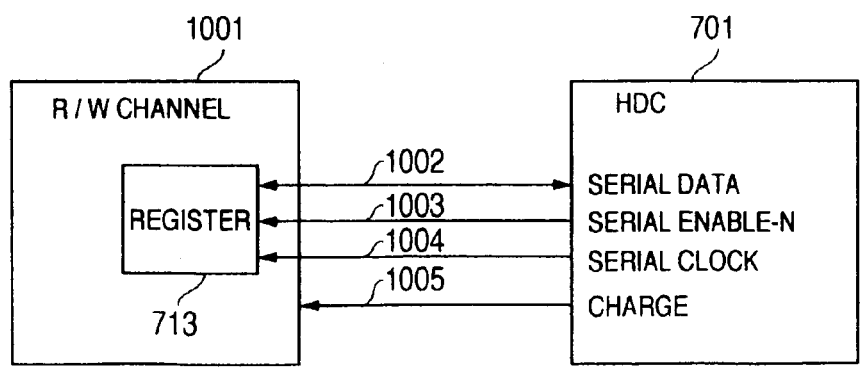
FIG. 19 is a block diagram showing an interface between R/W channel 1001 and HDC 701.
Figure 20:
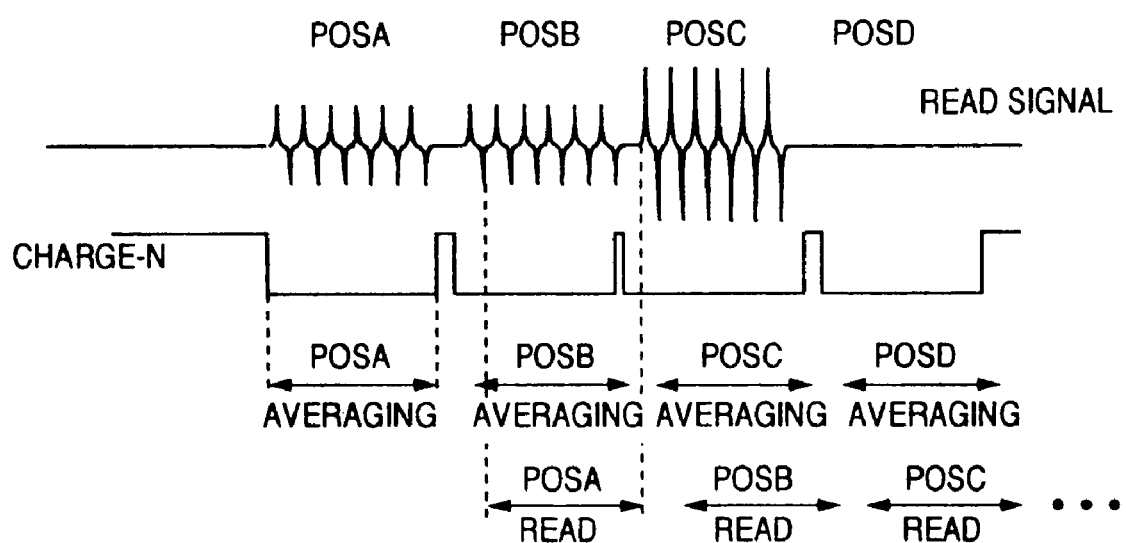
FIG. 20 is a chart showing the timing relationship between averaging processing and positional signal transmission/reception.

[3] Terminals Used for Transmitting and/or Receiving Positional Information (Refer to FIGS. 19 and 20)

Now, the terminals used for transmitting and/or receiving the positional information between HDC 701 and R/W channel 1001 will be described.

The positional information which is accepted to the HDC is not an analog value of the prior art, but is a digital value in the present embodiment. It may be hard to newly add the R/W channel 1001 with a dedicated bus which is exclusively used for accepting the positional information.

The R/W channel 1001 has a register 713 in which preset values of parameters and the like of various parts are stored. The channel 1001 also has ports (generally often serial ports) used for presetting/reading parameters to/from the register 713. The serial ports comprise a Serial Data 1002 for transmitting/receiving data to/from an external chip, a Serial Enable −N 1003 for asserting a serial circuit of the R/W channel, and a Serial clock 1004 which generates a reference clock for transmitting/receiving data as shown in FIG. 19. There is a charge signal 1005 which is representative of a period of the positional signal until A, B, C and D.

While the R/W channel is conducting a read/write operation from/to a storage medium, presetting and the like of the register 713 is never conducted via the port. Accepting of the positional signal via the port may be devised. In other words, as shown in FIG. 20, A/D conversion and averaging is conducted by R/W channel 1001 each time the charge signal 1005 is asserted by the HDC. Hence, HDC 701 is caused to read data via the serial port (Serial Data line 1002) after lapse of a predetermined period of time (the time which is taken for the R/W channel to finish the preparation of averaging) since the charge signal 1005 is negated. This enables the positional information to be accepted into the HDC without increasing the number of the terminals.

Figure 21:
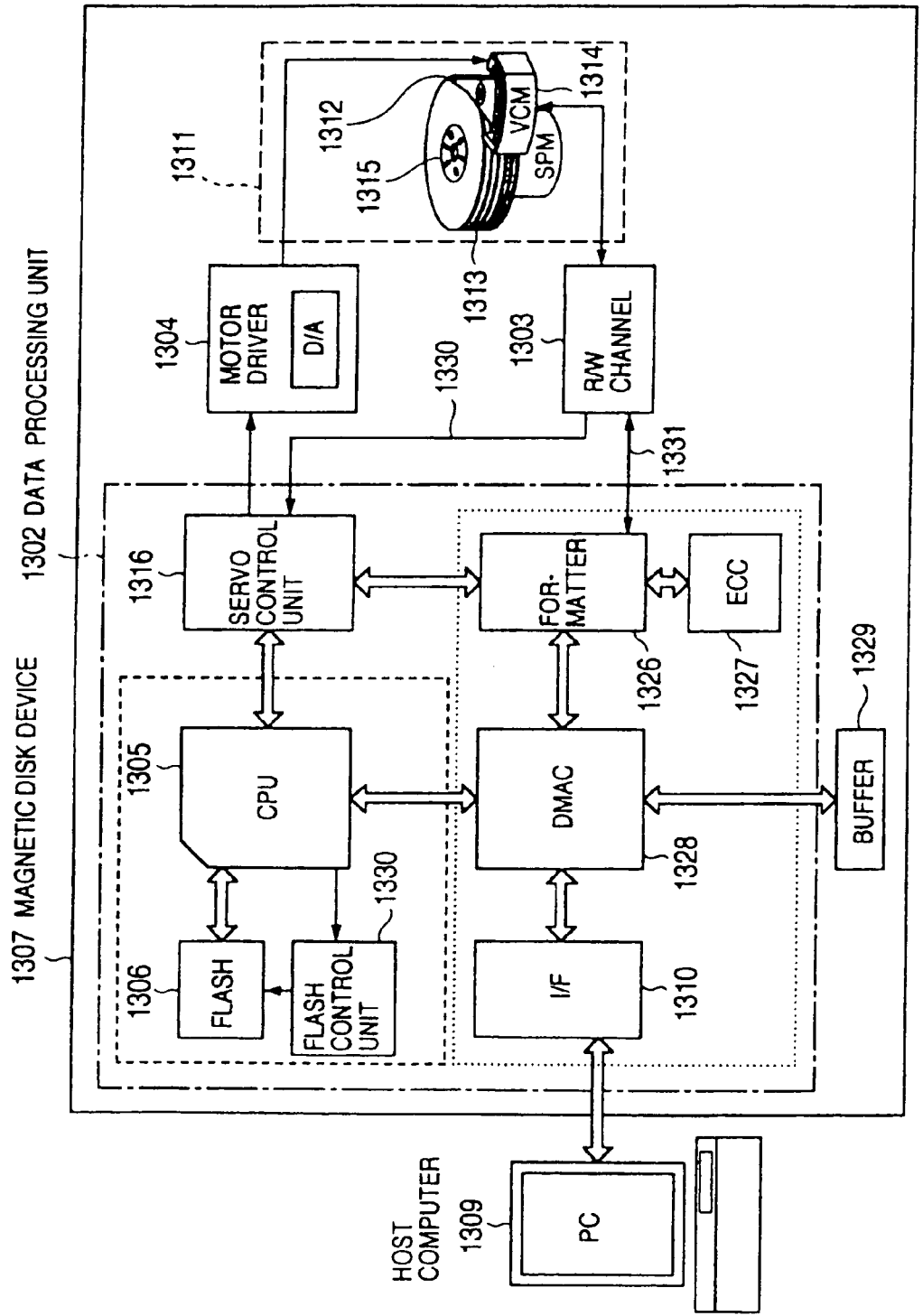
FIG. 21 is a block diagram showing the configuration of an entire magnetic disk device including the R/W channel of the present invention.

A magnetic recording device to which the R/W channel of the above-mentioned embodiment is applied will be described briefly with reference to FIG. 21.

Operation of standard data read will be described.

A case in which a magnetic disk device 1307 is connected with a host computer 1309 via a standard interface is presumed. The host computer 1309 sends an instruction of data reading to the disk device 1307 in accordance with an interface protocol.

A host I/F unit 1310 in a data processing unit 1302 of the magnetic disk device 1307 receives the sent command and sends it to a CPU 1305. The CPU 1305 interprets this command and issues an operation instruction (instruction for a reading operation) to each part depending upon a result of interpretation. For example, an instruction to actuate a mechanical unit 1314 (medium 1313, magnetic head 1312, VCM (Voice Coil Motor) 1314, spindle motor 1315) for moving the magnetic head 1312 to a sector to be read is issued to a servo control unit 1316.

Each part which constitutes the magnetic disk device 1307 starts to operate in response to an instruction from CPU 1305. For example, the above-mentioned servo control unit 1316 actuates the VCM 1314 to move the magnetic head 1312 to the sector to be read by issuing an instruction to the motor driver 1304. The instruction to the motor driver 1304 is prepared based upon the positional signal which is output from the read/write channel 1303 in this case.

When the magnetic head 1312 reaches the position of the sector to be read in such a manner, reading of the data stored in the sector in interest is commenced. The read/write channel 1303 converts an analog signal which is read by the magnetic head 1312 into an NRZ (non Return to Zero) signal. A formatter unit 1326 of the data processing unit 1302 accepts this NRZ signal and sends it to an ECC processing unit 1327. The unit also sends this signal to a data buffer 1329 via a buffer control unit (DMAC) 1328.

If the ECC processing unit 1329 does not find an error, the interface control unit 1310 transfers the read data stored in the data buffer 1328 to the host computer. At this time, CPU 1305 indexes the data sector number/track in each position of the magnetic head 1312 by using format management information stored in a flash memory 1306. The data stored in the flash memory 1306 can be changed by a command from the host computer 1309. This enables the disk device to be adjusted by rewriting the content in the flash memory on regular checking even if a bug is found after shipping of the disk device.

The digital value (positional information) which is a result of averaging of peak values of the servo signal is accepted to the servo control unit 1316 from the read/write channel 1303 via a dedicated line 1330. If the number of terminals is limited, the dedicated line 1330 may be a serial bus. If the data processing unit 1302 is integral with the read/write channel 1303, they may be connected to each other by a dedicated bus. If the data processing unit 1302 and the read/write channel 1303 are on different chips, the NRZ bus 1331 may be used. A numerical value (positional information) which is an averaged servo signal is accepted to the servo control unit 1316 via the above mentioned path and is used for head positioning control. Although it is not apparent in the drawings, an instruction to change the sensitivity of ADC 706 in the above-mentioned embodiment is issued from the CPU 1305 in the case of FIG. 21.

The influence of noise can be reduced and highly accurate positional information can be generated in the above-mentioned embodiment. This can achieve highly precise positioning of the head.

Since the peak hold value is output in the form of an analog signal and is digitized in an A/D converter on a different chip in the prior art, the prior art disk device is sensitive to noise on the circuit board. However, the positional signal quality can be maintained since the read positional signal is digitized in the same chip in the foregoing embodiment. There is no risk of routing of the positional signal out to a different chip.

If the above-mentioned averaging processing is conducted by an averaging circuit which is included in a learning circuit, the present invention can be applied without inviting an expansion in the circuit.

A peak hold circuit of the burst signal in the prior art suppresses the time constant of the circuit so that the hold voltage is not influenced by noise. To this end, it is necessary to record the burst signal on the medium for a period of time or longer (usually about 1 s/burst). In other words, there is a limitation in reduction in the recording time of the burst signal. It is impossible to further reduce it. In contrast to this, the present invention conducts averaging of the burst signal by numerical processing after the burst signal is sampled at a high rate. Accordingly, only the sampled values (peaks) to be processed for averaging, the number of which is significant for averaging processing, is required. The averaging processing has no correlation with the period of time for which the burst signal is recorded. That is, the positional signal area on the medium can be reduced by enhancing the frequency of writing of the positional signal. This will lead to an increase in the recording capacity of the medium.

The accuracy of head positioning is enhanced since the accuracy of the positional information can be appropriately changed depending upon the read operating state.

Necessity of additional new terminals for embodying the present invention is omitted by using the port used for setting the register 713.

The present invention may be embodied for any of hard disk, floppy disk device, opto-magnetic disk device, MD device and the like technology.

A term "processing circuit" is relevant to the R/W channel 1001 in the foregoing embodiments. A term "drive means" is relevant to the VCM 102, spindle motor 103 and the like. A term "A/D converting means" is relevant to the ADC 706. A term "register" is relevant to the register 713. A term "sensitivity changing means" is relevant to the reference power supply voltage changing circuit 1101 (or input sensitivity changing circuit 1102). A term "positional information" represents a value which is obtained by the above-mentioned averaging processing.

Since analog-digital conversion of the servo signal is conducted in the signal processing device and the converted signal is fed to the data processing unit via the data bus and is held in the data processing unit as mentioned above in the embodiment of the present invention, an increase in the number of terminals of the signal processing device can be prevented and reduction in price can be achieved.

By holding the servo data in the data processing unit, malfunction of the analog circuit of the signal processing device due to access to the servo data can be prevented so that its reliability can be enhanced.

Further, noise components in the positional signal are reduced and highly accurate positional information can be obtained. This enables highly accurate head positioning.

Since it is not necessary to take out positional information as an analog value to another chip, no deterioration of the positional information occurs. Since data which is a source of the positional information is taken out from a PR equalizer and the subsequent state, the positional signal area can be reduced to enhance the format efficiency of the disk device and designing of the circuit board becomes easier. If averaging of the positional information is conducted by an averaging circuit of a learning circuit on the R/W channel, increase in the number of circuits can be suppressed. Increase in the number of terminals of the R/W channel can be prevented by using a port for setting/reading of parameters on the prior art R/W channel. Since the sensitivity of A/D conversion can be externally adjusted according to needs, an increase in the word length of A/D conversion can also be suppressed. For the above-mentioned reasons, highly precise positional information can be accepted into the servo control circuit and high precision positioning of a head can be achieved.

What is claimed is:

1. A disk device to be coupled to a host computer comprising:
   a magnetic head;
   a head amplifier coupled to said magnetic head;
   a recording medium on which a data block and a servo block are stored, wherein said servo block has servo burst data recorded therein for controlling a position of said magnetic head;
   a voice coil motor for moving said magnetic head above said recording medium;
   a spindle motor coupled to said recording medium;
   a motor driver controlling said spindle motor;
   a signal processing device for detecting data in said data block from a read signal read from said recording medium and for outputting said detected data via a NRZ bus;
   a data processing device for transferring write data inputted from said host computer to said signal processing device via said NRZ bus, and reading out data transferred from said signal processing device via said NRZ bus to transfer to said host computer; and
   a processor controlling said signal processing device and said data processing device;
   said signal processing device including an analog-to-digital converter to convert servo burst data in said read signal from analog to digital, wherein said servo burst data outputted from said analog-to-digital converter is outputted to said data processing device through said NRZ bus;

wherein said signal processing device further includes an Automatic Gain Control, a burst signal detector, a clock generator, a pulse generator, an encoder, and a decoder, wherein said read signal read from said recording medium is outputted from said head amplifier to said Automatic Gain Control to control an amplitude gain of said read signal, wherein said pulse generator controls the timing of outputting a clock to said encoder generated by said clock generator, wherein said encoder encodes write data and decodes said read signal outputted from said analog-to-digital converter;

wherein said burst signal detector detects an address of said servo block from said read signal, and wherein said data processing device is able to hold said address of said servo block which is inputted via said NRZ bus and to output the address of said servo block to a second bus.

2. The disk device according to claim 1, wherein said signal processing device further includes a writable and readable register to and from which writing and reading can be performed via said NRZ bus, wherein said data processing device is able to access said writable and readable register via said NRZ bus from said second bus.

* * * * *